United States Patent
Ruchser et al.

(10) Patent No.: US 7,699,898 B2
(45) Date of Patent: Apr. 20, 2010

(54) METAL COMPLEX DYE MIXTURES

(75) Inventors: Thomas Ruchser, Griesheim (DE); Oliver Steinau, Seeheim-Jugenheim (DE); Andreas Giehl, Niedernhausen (DE)

(73) Assignee: DyStar Textilfarben GmbH & Co. Deutschland KG, Frankfurt am Main (DE)

( * ) Notice: Subject to any disclaimer, the term of this patent is extended or adjusted under 35 U.S.C. 154(b) by 325 days.

(21) Appl. No.: 11/908,981

(22) PCT Filed: Mar. 15, 2006

(86) PCT No.: PCT/EP2006/060760

§ 371 (c)(1),
(2), (4) Date: Nov. 12, 2007

(87) PCT Pub. No.: WO2006/100200

PCT Pub. Date: Sep. 28, 2006

(65) Prior Publication Data

US 2008/0189883 A1  Aug. 14, 2008

(30) Foreign Application Priority Data

Mar. 19, 2005 (DE) .................. 10 2005 012 730

(51) Int. Cl.
D06P 1/30 (2006.01)
C09B 45/00 (2006.01)
(52) U.S. Cl. .................. 8/636; 8/638; 8/639; 8/640; 534/700
(58) Field of Classification Search .................. 8/636, 8/638, 639, 640; 534/700
See application file for complete search history.

(56) References Cited

U.S. PATENT DOCUMENTS

| 4,452,602 A | * | 6/1984 | Puntener et al. ............... 8/404 |
| 4,553,976 A | | 11/1985 | Raisin et al. |
| 5,231,172 A | | 7/1993 | Beck et al. |
| 5,529,585 A | | 6/1996 | Schrell et al. |
| 5,986,087 A | | 11/1999 | Schrell et al. |
| 6,001,995 A | | 12/1999 | Schrell et al. |

FOREIGN PATENT DOCUMENTS

| DE | 292665 A5 | 8/1991 |
| EP | 061670 A1 | 10/1982 |
| EP | 124679 A1 | 11/1984 |
| EP | 0260561 A2 | 3/1988 |
| EP | 0267385 A2 | 5/1988 |
| EP | 0538785 A2 | 4/1993 |
| EP | 0692559 A1 | 1/1996 |
| WO | WO-96/37641 A1 | 11/1996 |
| WO | WO-96/37642 A1 | 11/1996 |

OTHER PUBLICATIONS

STIC Search Report dated Oct. 28, 2009.*

* cited by examiner

Primary Examiner—Eisa B Elhilo
(74) Attorney, Agent, or Firm—Connolly Bove Lodge & Hutz LLP

(57) ABSTRACT

Dye mixtures comprising one or more, such as two or three, preferably 1 or 2, dyes of the formula (1) and at least 2 dyes of the formula (2)

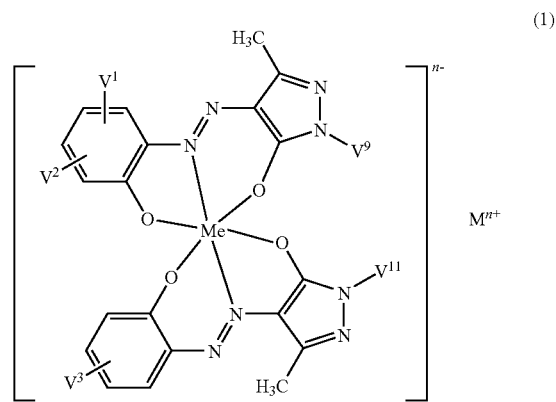

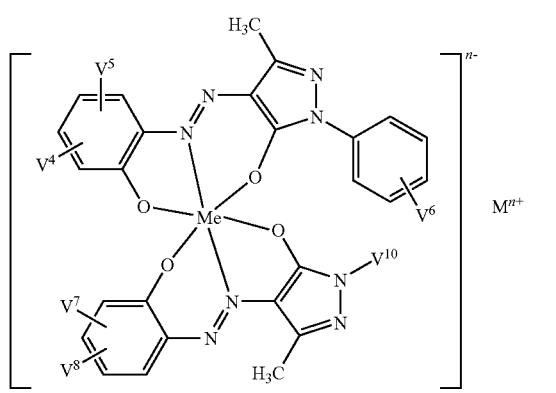

in which Me, M, n, and $V^1$ to $V^{11}$ are as defined in claim 1, their preparation, and their use for dyeing and printing hydroxyl- and carboxamido-containing material.

14 Claims, No Drawings

METAL COMPLEX DYE MIXTURES

RELATED APPLICATIONS

This application is a national stage application (under 35 U.S.C. 371) of PCT/EP2006/0607960 filed Mar. 15, 2006, which claims benefit of German application 102005 012 730.4 filed Mar. 19, 2005.

The present invention is situated within the field of acid dyes and metal complex dyes.

Individual dyes frequently show pronounced weaknesses in the on-tone dyeing of material containing hydroxyl and carboxamido groups, and especially when dyeing blends of natural and synthetic polyamide fiber materials, these weaknesses relating in particular to the uniform dyeing of the different blend constituents and uniform exhaustion from the dyeing liquor. Yet what the market requires are dye systems which go on uniformly and dye all of the fiber constituents on tone.

Document EP 124 679 describes mixtures of metal complex dyes which are intended for dyeing and printing wool and synthetic polyamide blend fabrics or yarns but which still exhibit deficiencies in respect of the on-tone dyeing of these blend fabrics.

It is an object of the present invention to provide dye mixtures for on-tone dyeing of material containing hydroxyl and carboxamido groups and also, in particular, for dyeing blends of natural and synthetic polyamide fiber materials, said mixtures overcoming the aforementioned disadvantages.

Surprisingly it has been found that a mixture comprising at least one of the red dyes of the below-defined formulae (1) and also at least one of the red dyes of the formula (2) meets this requirement.

The present invention accordingly provides dye mixtures which comprise one or more dyes of the formula (1) and one or more dyes of the formula (2)

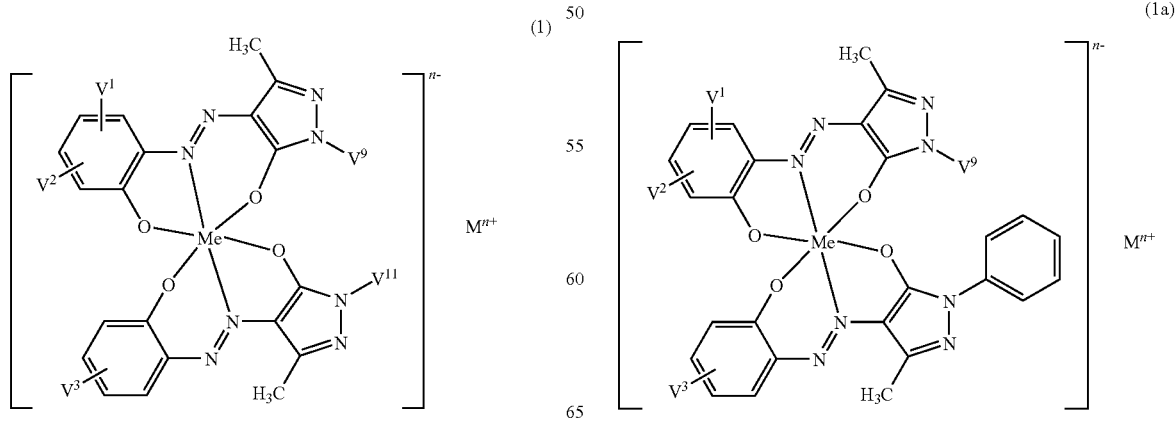

(1)

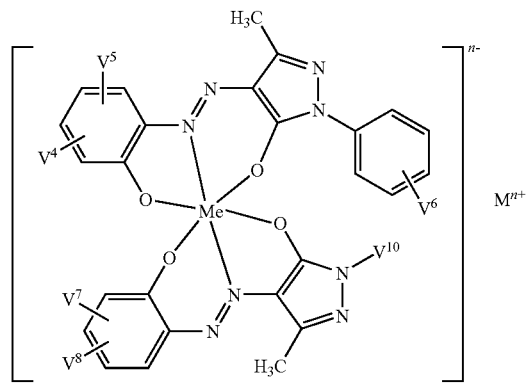

(2)

in which

Me is $Cr^{(3+)}$ or $Co^{(2+)}$,

M is hydrogen, an alkali metal, such as sodium, potassium or lithium, or the equivalent of an alkaline earth metal, such as calcium, preferably hydrogen and particularly sodium, potassium or lithium, n is 1 or 2

$V^1$ to $V^8$ are independently of one another hydrogen, cyano, $C_1$-$C_4$-alkyl, $C_1$-$C_4$-alkylsulfonyl, $C_1$-$C_4$-alkoxy, halogen, nitro, sulfo, sulfamoyl, N—$C_{1-4}$-alkylsulfamoyl, N—$C_{1-4}$-dialkylsulfamoyl, N—$C_{1-2}$-alkoxy-$C_{1-2}$-alkylsulfamoyl, preferably nitro, sulfo, and dimethylsulfamoyl, $V^9$ and $V^{10}$ are independently of one another phenyl, $C_1$-$C_4$-alkylphenyl, nitrophenyl, sulfophenyl, N—$C_{1-4}$-alkylsulfamoylphenyl, halophenyl, cyanophenyl, preferably phenyl and $C_1$-$C_4$-alkylphenyl, sulfamoylphenyl, $V^{11}$ is hydrogen, phenyl, $C_1$-$C_4$-alkylphenyl, nitrophenyl, sulfophenyl, N—$C_{1-4}$-alkylsulfamoylphenyl, halophenyl, cyanophenyl, preferably phenyl and $C_1$-$C_4$-alkylphenyl, and, if $V^{11}$ is not hydrogen, at least one of the radicals $V^7$ or $V^6$ is N—$C_{1-4}$-dialkyl-sulfamoyl.

Preferred dye mixtures comprise at least one dye of the formula (1a)

(1a)

and also at least one dye of the formula (2b)

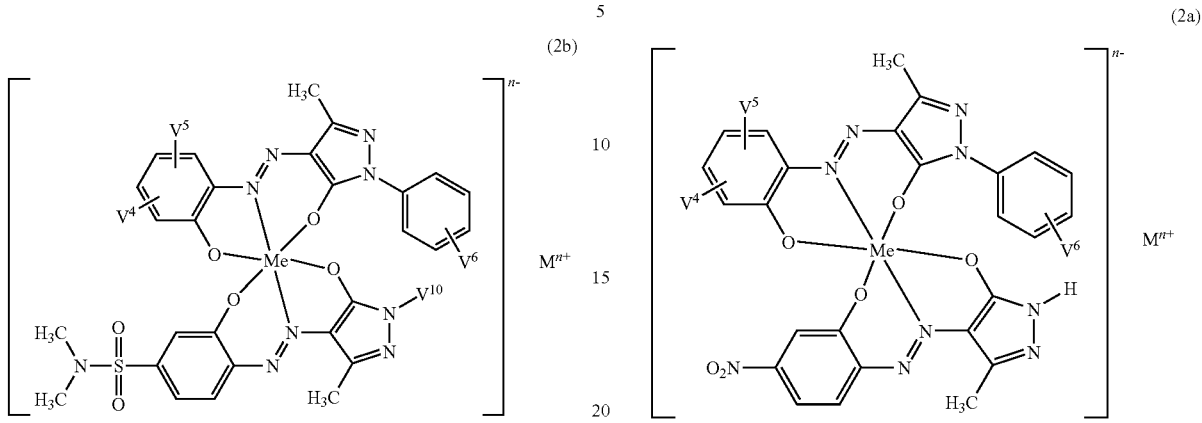

where

Me is $Cr^{(3+)}$ or $Co^{(2+)}$,

M is hydrogen, an alkali metal, such as sodium, potassium or lithium, or the equivalent of an alkaline earth metal, such as calcium, preferably hydrogen and particularly sodium, potassium or lithium, n is 1 or 2, $V^1$ to $V^6$ are independently of one another hydrogen, cyano, $C_1$-$C_4$-alkyl, $C_1$-$C_4$-alkylsulfonyl, $C_1$-$C_4$-alkoxy, halogen, nitro, sulfo, sulfamoyl, N—$C_{1-4}$-alkylsulfamoyl, N—$C_{1-4}$-dialkylsulfamoyl, N—$C_{1-2}$-alkoxy-$C_{1-2}$-alkylsulfamoyl, preferably nitro, sulfo, and dimethylsulfamoyl, $V^9$ and $V^{10}$ are independently of one another phenyl, $C_1$-$C_4$-alkylphenyl, nitrophenyl, sulfophenyl, N—$C_{1-4}$-alkylsulfamoylphenyl, halophenyl, cyanophenyl, preferably phenyl and $C_1$-$C_4$-alkylphenyl, sulfamoylphenyl.

Preferred dye mixtures of the invention are also those comprising at least one dye of the formula (1b), at least one dye of the formula (2a), and at least one dye of the formula (2b)

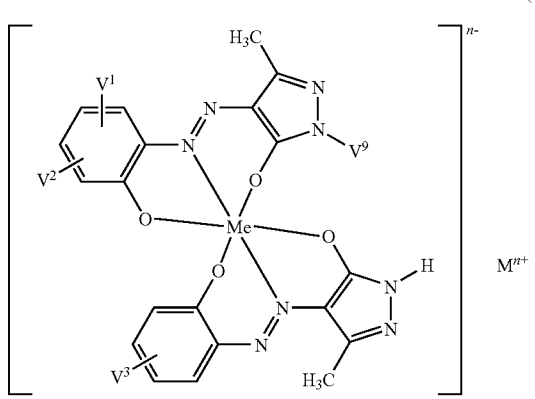

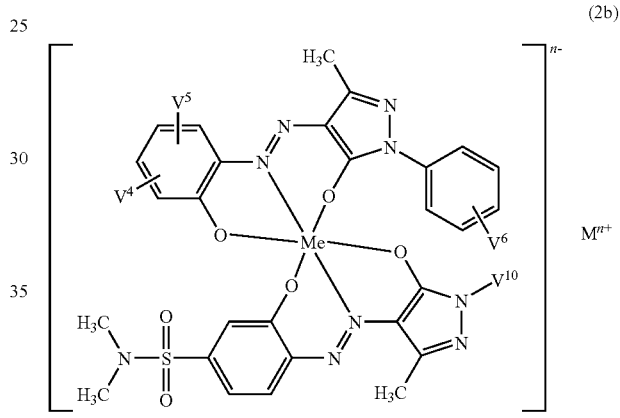

where

Me is $Cr^{(3+)}$ or $Co^{(2+)}$,

M is hydrogen, an alkali metal, such as sodium, potassium or lithium, or the equivalent of an alkaline earth metal, such as calcium, preferably hydrogen and particularly sodium, potassium or lithium, n is 1 or 2, $V^1$ to $V^6$ are independently of one another hydrogen, cyano, $C_1$-$C_4$-alkyl, $C_1$-$C_4$-alkylsulfonyl, $C_1$-$C_4$-alkoxy, halogen, nitro, sulfo, sulfamoyl, N—$C_{1-4}$-alkylsulfamoyl, N—$C_{1-4}$-dialkylsulfamoyl, N—$C_{1-2}$-alkoxy-$C_{1-2}$-alkylsulfamoyl, preferably nitro, sulfo, and dimethylsulfamoyl, $V^9$ and $V^{10}$ are independently of one another phenyl, $C_1$-$C_4$-alkylphenyl, nitrophenyl, sulfophenyl, N—$C_{1-4}$-alkylsulfamoylphenyl, halophenyl, cyanophenyl, preferably phenyl and $C_1$-$C_4$-alkylphenyl, sulfamoylphenyl.

In particular Me is chromium$^{(3+)}$ and $M^{n+}$ is an alkali metal.

Particularly preferred dye mixtures comprise at least one dye of the formula (1b-1), at least one dye of the formula (2a-1) and at least one dye of the formula (2b-1)

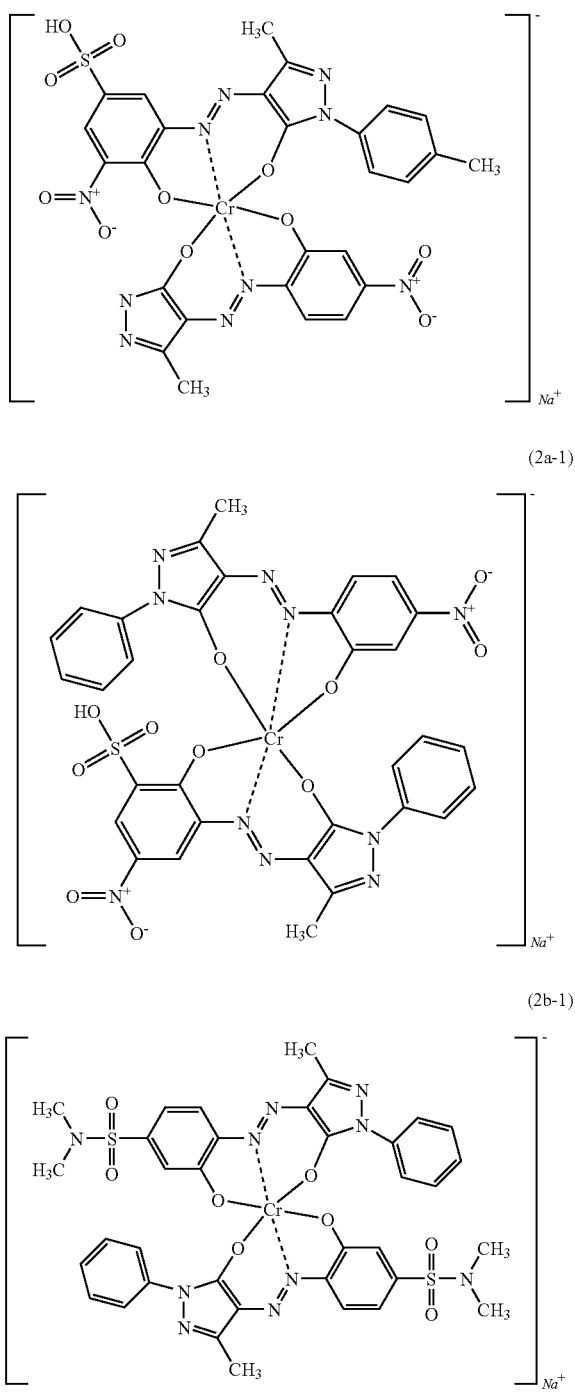

The dye mixtures of the invention comprise dyes of the formula (1) and dyes of the formula (2) in a molar ratio of dye or dyes (1) to dye or dyes (2) of 95:5 to 5:95, preferably of 80:20 to 40:60. In the case of the preferred mixtures of the invention comprising a dye of the formula (2a) and a dye of the formula (2b) in addition to a dye of the formula (1), the ratio of dyes (2b) to (2a) is 5:95 to 95:5.

As individual dyes, the dyes of the formula (1) and of the formula (2) are well known, are available on the market, have been widely described in the literature, and can be prepared by the processes described therein.

The dye mixtures of the invention can be prepared by an entirely conventional procedure, such as by mechanical mixing of the individual dyes, whether in the form of their powders or granules or their synthesis solution or of aqueous solutions of the individual dyes in general, which may additionally comprise typical auxiliaries.

The dye mixtures of the invention can be present as a preparation in solid or in liquid (dissolved) form. In solid form they generally comprise the electrolyte salts typical of water-soluble and especially of fiber-reactive dyes, such as sodium chloride, potassium chloride, and sodium sulfate, and may further include the auxiliaries customary in commercial dyes, such as buffer substances capable of setting a pH in aqueous solution of between 3 and 7, such as sodium acetate, sodium borate, sodium hydrogencarbonate, sodium dihydrogenphosphate, sodium tricitrate, and disodium hydrogenphosphate, small amounts of siccatives or, when present in liquid, aqueous solution (including the presence of thickeners of the kind typical for print pastes), they may also include substances which ensure a long keeping life for these preparations, such as mold preventatives, for example.

In general the dye mixtures of the invention are present in the form of dye powders containing 10% to 80% by weight, based on the dye powder or preparation, of an electrolyte salt, which is also referred to as a standardizer. These dye powders may additionally include the aforementioned buffer substances in a total amount of up to 5% by weight, based on the dye powder. When the dye mixtures of the invention are present in aqueous solution, the total dye content of said aqueous solutions is up to about 50% by weight, such as between 5% and 50% by weight, for example, the electrolyte salt content of these aqueous solutions being preferably below 10% by weight, based on the aqueous solution; the aqueous solutions (liquid preparations) may include the aforementioned buffer substances in an amount, in general, of up to 10% by weight, preferably up to 2% by weight.

The dye mixtures of the invention possess valuable performance properties. They are used for uniformly dyeing and printing hydroxyl- and carboxamido-containing material, particularly for uniformly dyeing and printing natural or synthetic polyamide fiber materials, and also, in particular, for the single-bath on-tone dyeing of blends of natural and synthetic polyamide fiber materials.

Carboxamido-containing materials are, for example, synthetic and natural polyamides, particularly in the form of fibers, examples being wool and other animal hairs, silk, leather, nylon-6,6, nylon-6, nylon-11, and nylon-4. The stated polyamide fiber materials may be present in any of a wide variety of processing forms—for example, fiber, yarn, woven or knit—or else in the form of carpets.

Hydroxyl-containing materials are those of natural or synthetic origin, such as cellulose fiber materials or their regenerated products and polyvinyl alcohols, for example. Cellulose fiber materials are preferably cotton, but also other vegetable fibers, such as linen, hemp, jute, and ramie fibers; examples of regenerated cellulose fibers include staple viscose and filament viscose, and also chemically modified cellulose fibers, such as aminated cellulose fibers or fibers as described, for example, in WO 96/37641 and WO 96/37642 and also in EP-A-O 538 785 and EP-A-O 692 559.

The present invention accordingly also provides for the use of the dye mixtures of the invention for dyeing or printing these materials and to methods of dyeing or printing such materials in entirely conventional procedures for which a dye mixture of the invention is used as colorant. The materials are preferably employed in the form of fiber materials, particularly in the form of textile fibers, such as fabrics, or yarns, such as in the form of hanks or wound packages.

The dye mixtures of the invention can be applied to and fixed on the stated substrates, especially the stated fiber materials, by the application techniques which are known for water-soluble dyes, and particularly by those known for fiber-reactive dyes. This may be done employing the typical dyeing and printing techniques which are described in the literature and are known to the skilled worker (see, for example, H.-K. Rouette, Handbuch der Textilveredelung, Deutscher Fachverlag GmbH, Frankfurt am Main).

In addition to the dyes of the formulae (1) and (2) and water, the dyeing liquors and print pastes may include further adjuvants. Examples of adjuvants include wetting agents, antifoams, leveling agents, and agents influencing the properties of the textile material, such as softeners, flame retardancy adjuvants, soil, water, and oil repellents, or water softeners. Print pastes in particular may also include natural or synthetic thickeners, such as alginates and cellulose ethers, for example. The quantities of dye in the dye baths and print pastes may vary widely depending on the depth of color desired. Generally speaking, the dyes of the formulae (1) and (2) are present in amounts of 0.01% to 15% by weight each, in particular in amounts of 0.1% to 10% by weight, based on the material to be dyed and on the print paste, respectively.

The dye mixtures of the invention are preferably used for dyeing by the exhaust process. In that process dyeing takes place preferably at a pH of 3 to 7, in particular at 4 to 6. The liquor ratio may be chosen from within a wide range and is situated for example at between 5:1 and 50:1, preferably between 5:1 and 30:1. Dyeing is conducted preferably at temperatures of 70 to 110° C., in particular of 80 to 105° C.

To enhance the wet fastnesses of the dyed material it is possible to remove unfixed dye in an aftertreatment.

On the stated substrates, the dye mixtures of the invention are notable for uniform color buildup, good exhaustion and fixation, and good consistency of hue, and also for good fastness properties, especially good rub fastness, wet fastness, wet rub fastness, and light fastness. A particular advantage is the very good combinability of the stated dyes.

The red-dyeing dye mixtures of the invention are suitable, moreover, for combination dyeings with blue- or black-dyeing and/or yellow- to orange-dyeing acid dyes or mixtures of acid dyes, for the uniform, on-tone dyeing or printing of natural or synthetic polyamide fiber materials.

As blue- or black-dyeing dyes in the combination dyeings it is preferred to use, for example, the following C.I. dyes: Acid Blue 170, 171, 199, 200, 229, 317, 284, 296, 334, 335, Acid Black 058, 060, 061, 063, 099, 107, 131, 132, 140, 207, 218, 220, 222, and 244, corresponding to formulae (B1) to (B31), or mixtures of these dyes:

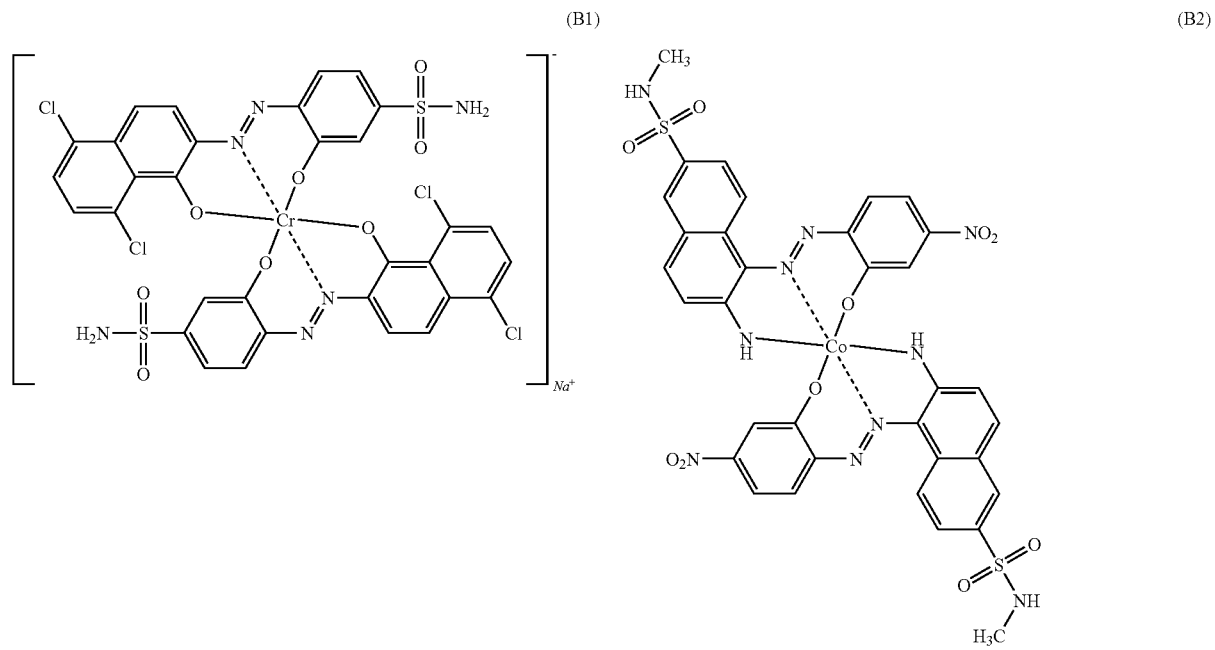

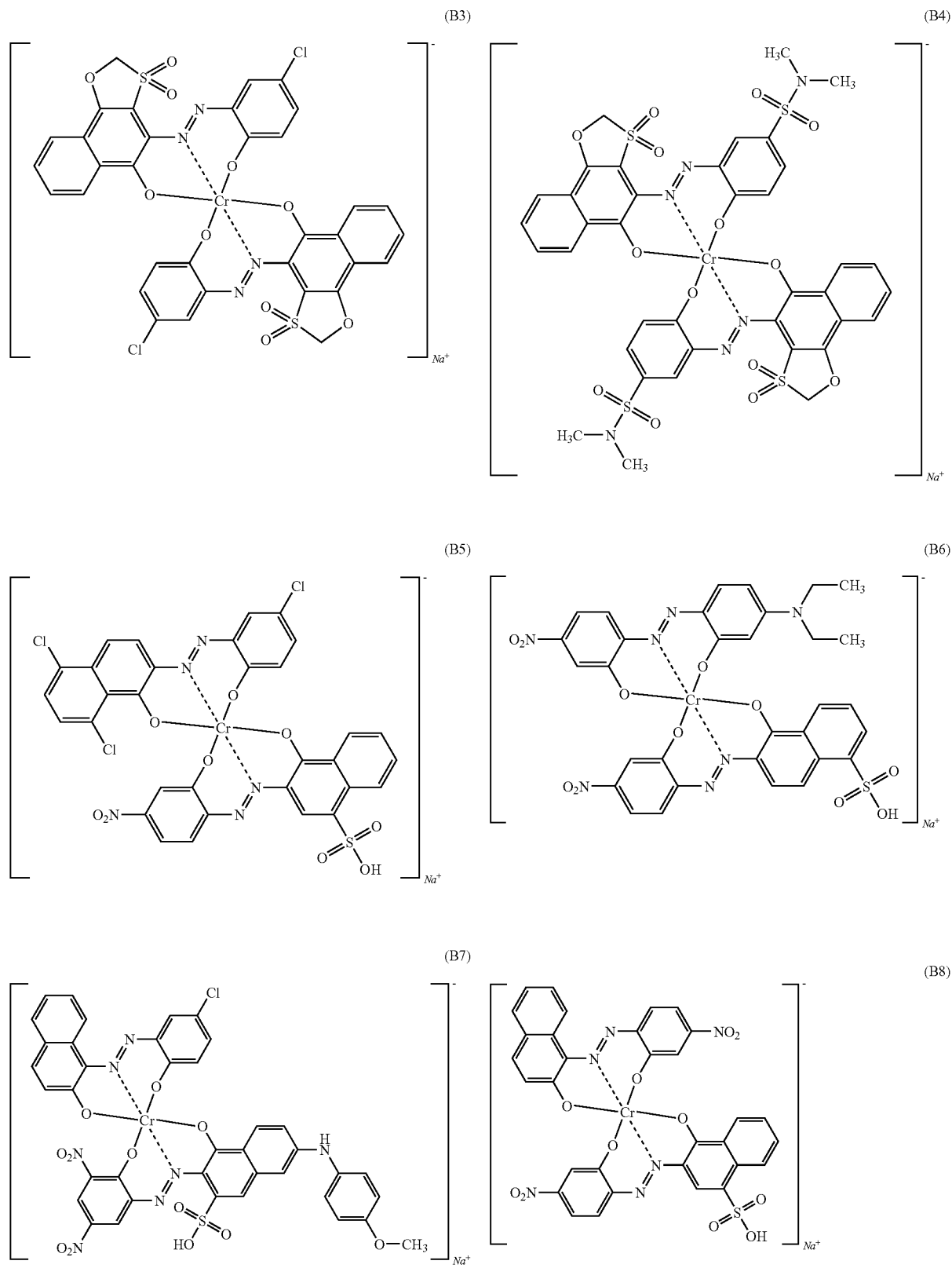

-continued
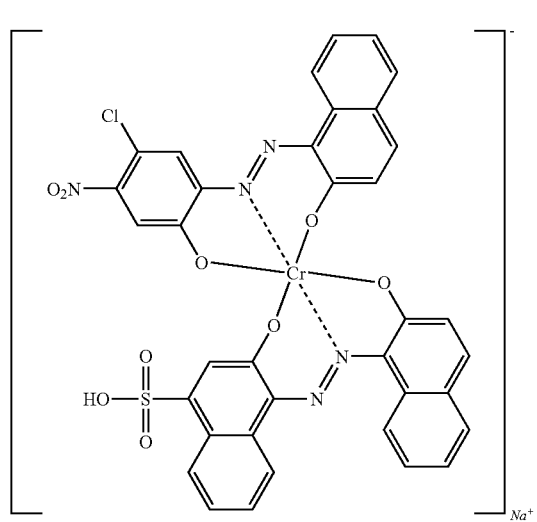
(B9)
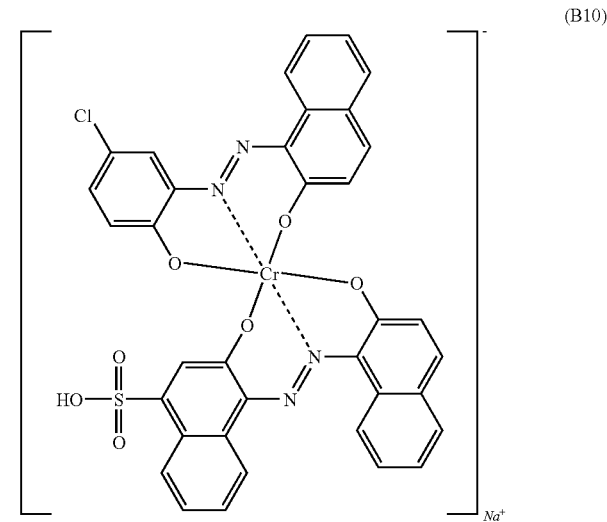
(B10)
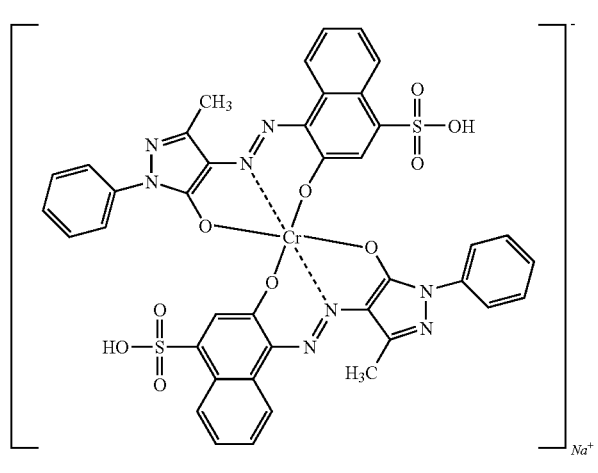
(B11)
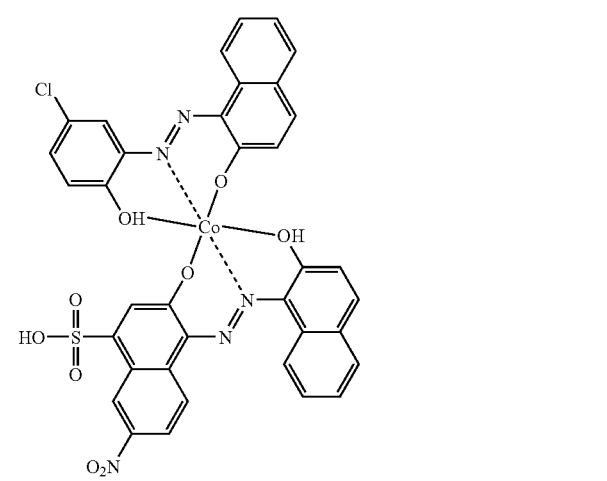
(B12)
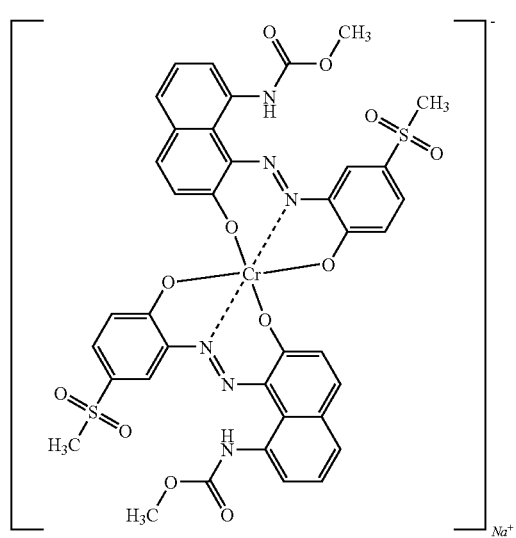
(B13)
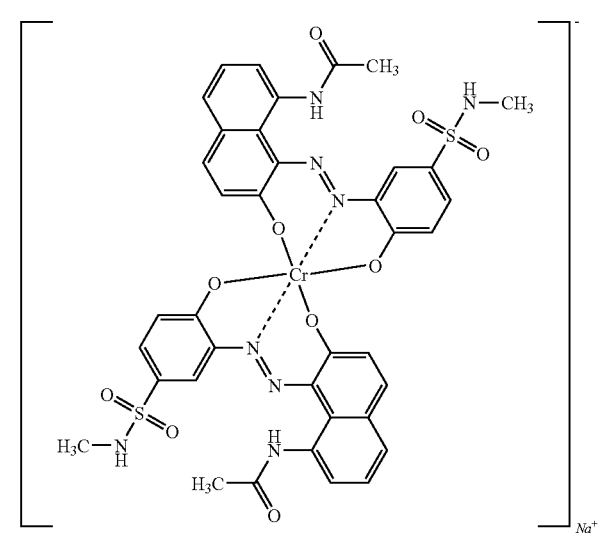
(B14)

-continued
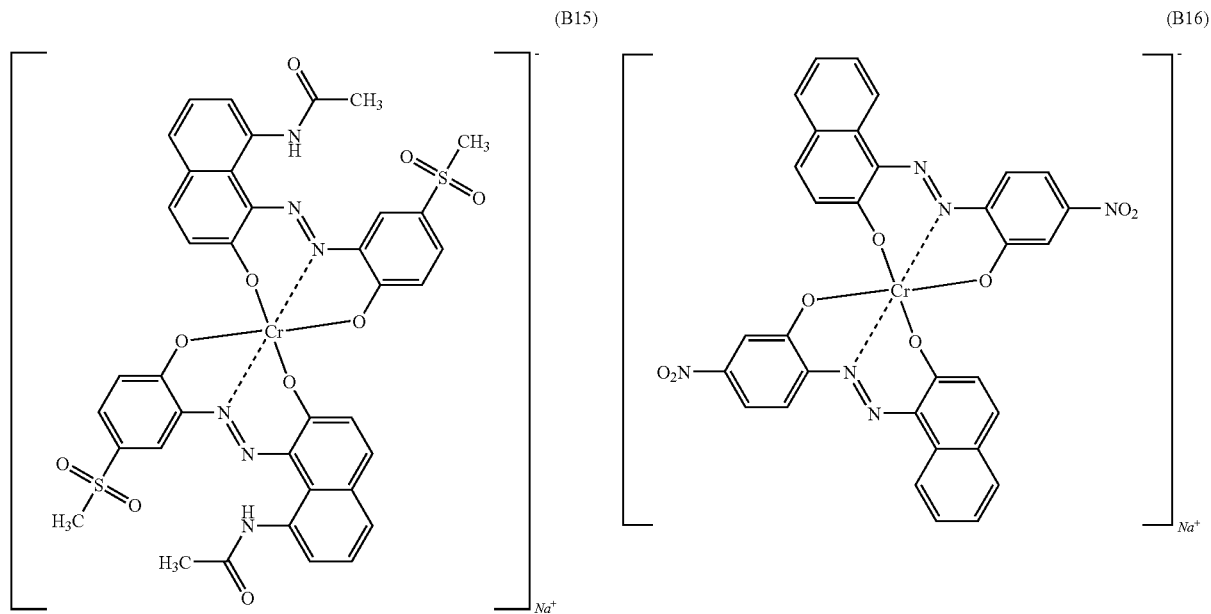
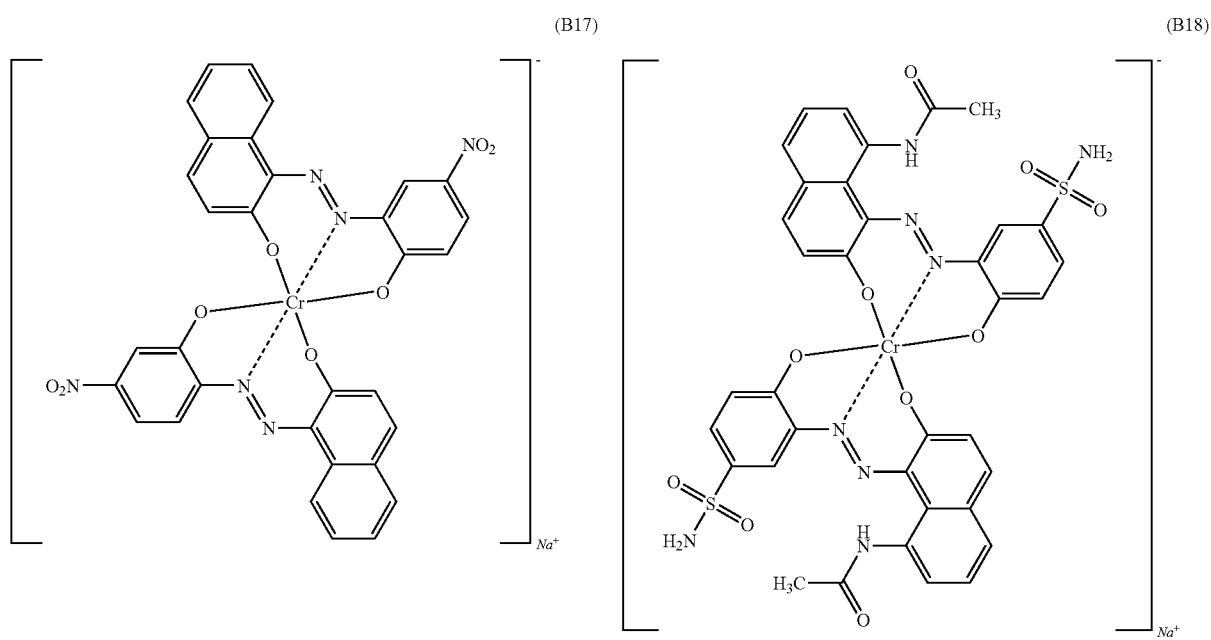

-continued
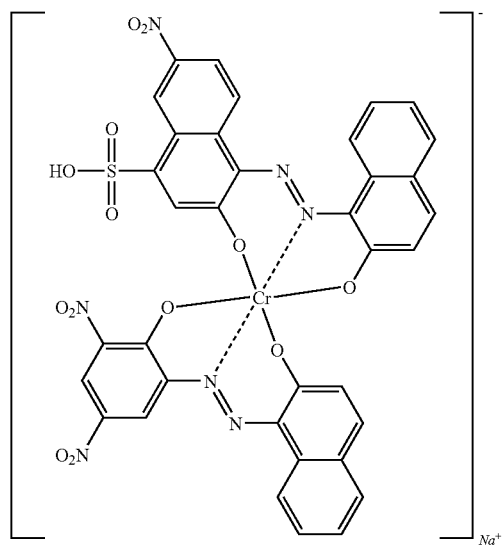
(B19)
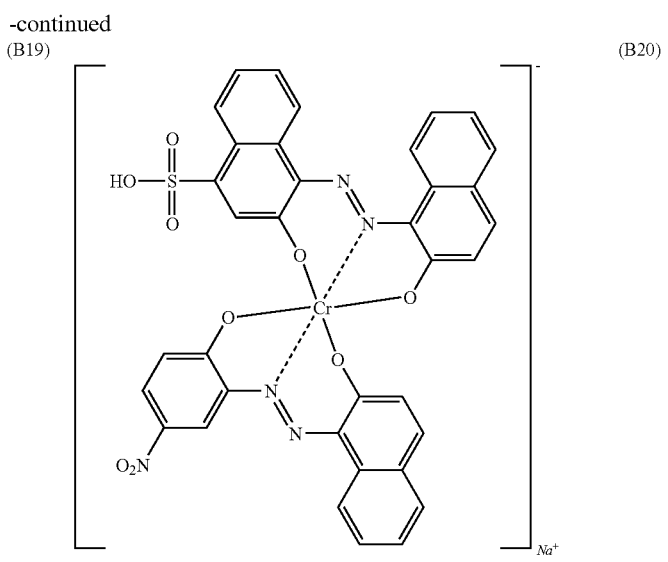
(B20)
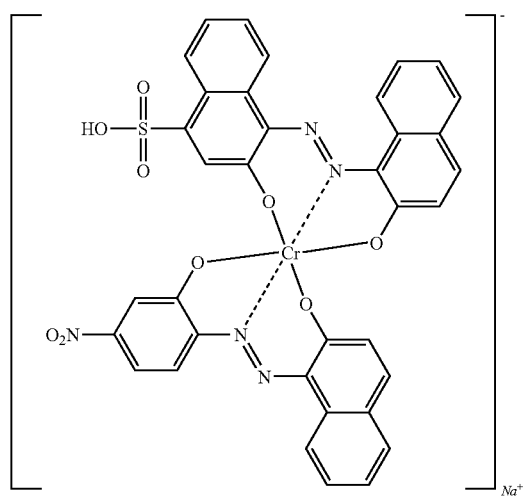
(B21)
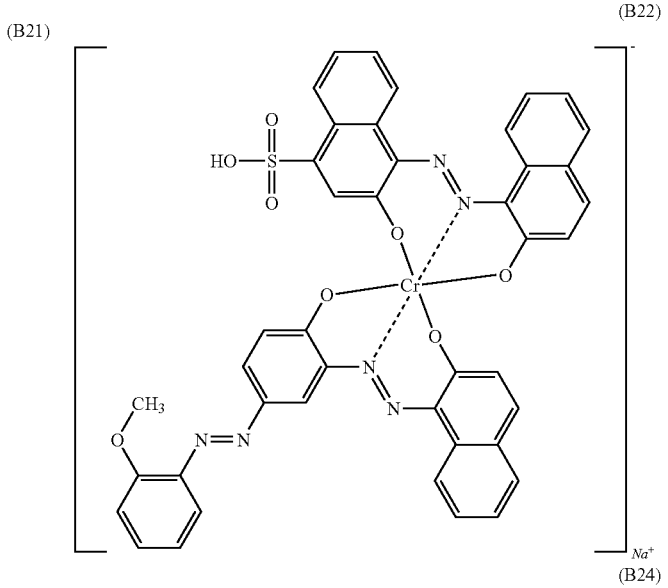
(B22)
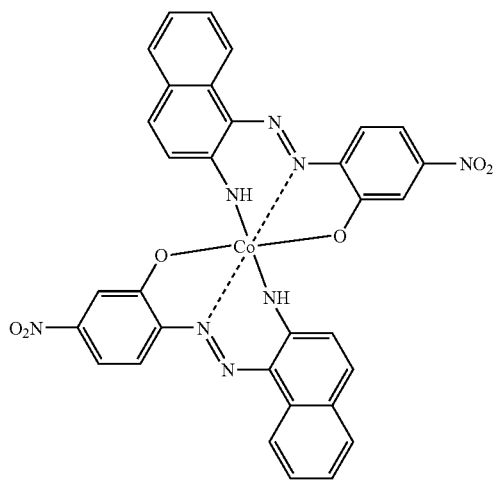
(B23)
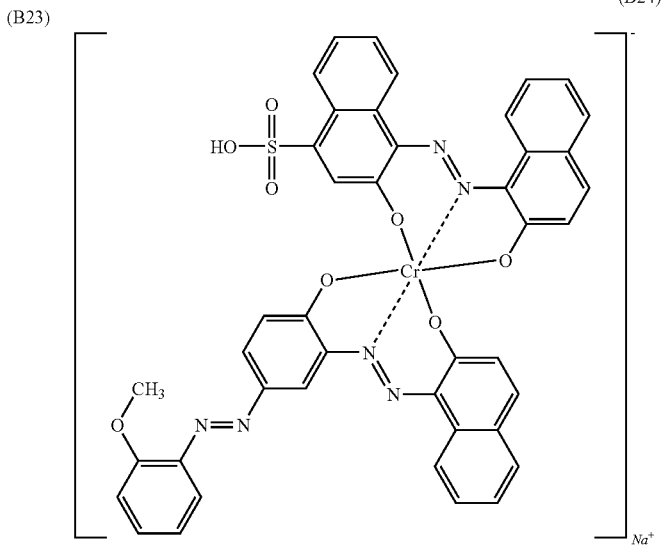
(B24)

-continued
(B25)
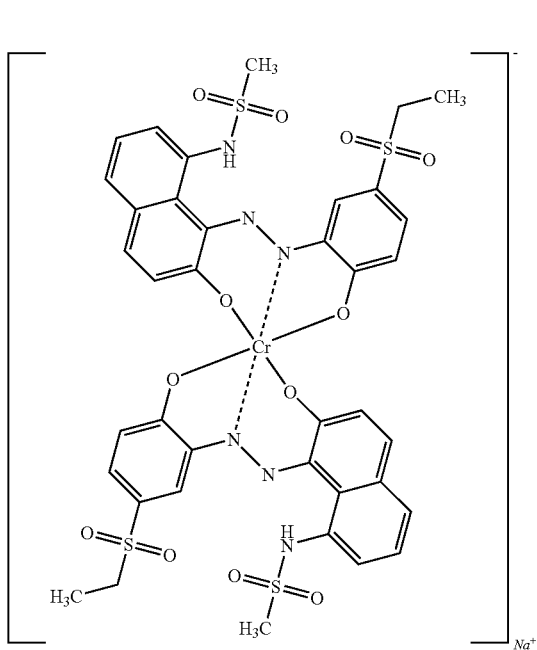
(B26)
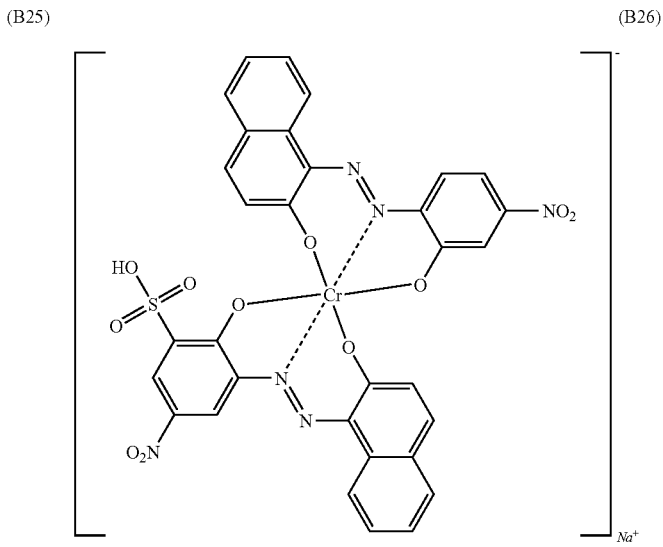
(B27)
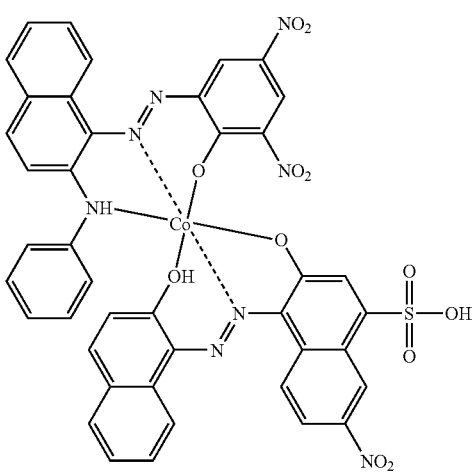
(B28)
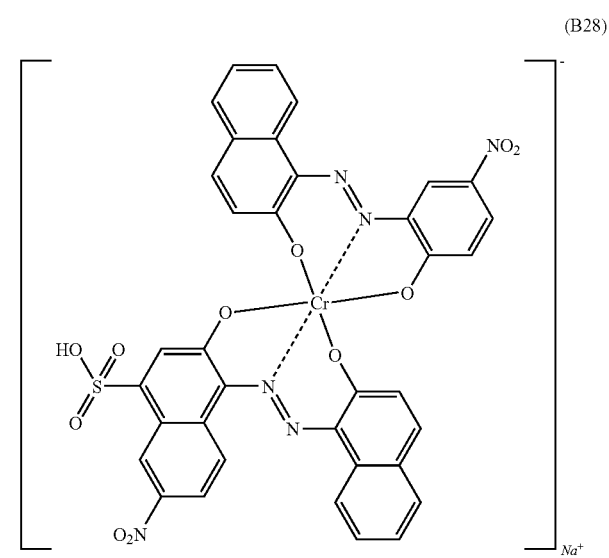

-continued
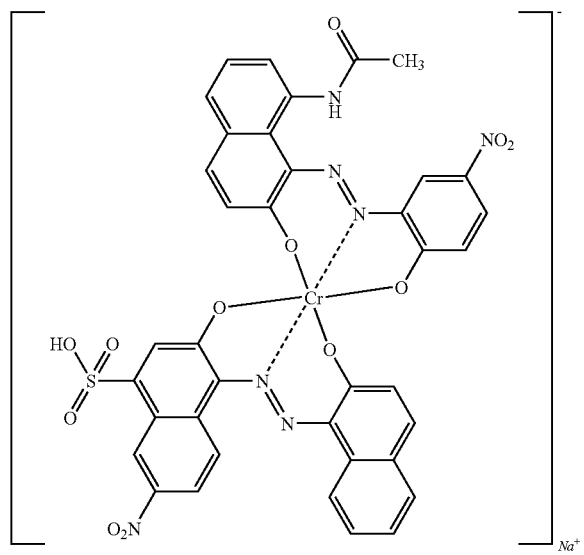
(B29)
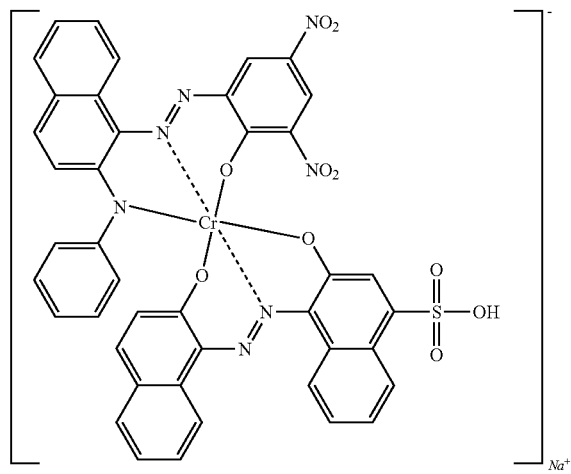
(B30)
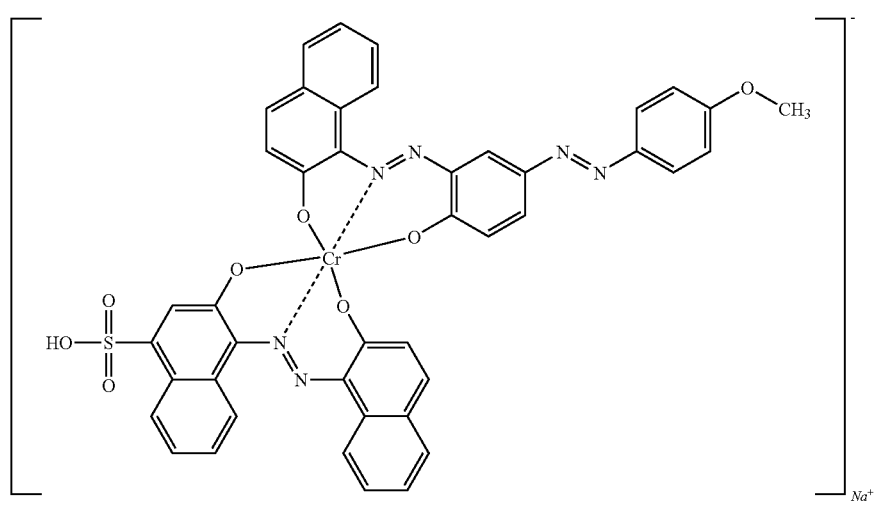
(B31)
Preferred yellow- or orange-dyeing acid dyes in the combination dyeings with the red dye mixtures of the invention are, for example, dyes with the C.I. names Acid Yellow 059, 116, 119, 137, 151, 155, 177, 182, 220, 232, 235, Acid Orange 060, 080, 086, 088, 107, 108, 117, 130, 144, 154, 162, 166, and 168 corresponding to the formulae (G1) to (G25), or mixtures of these dyes:

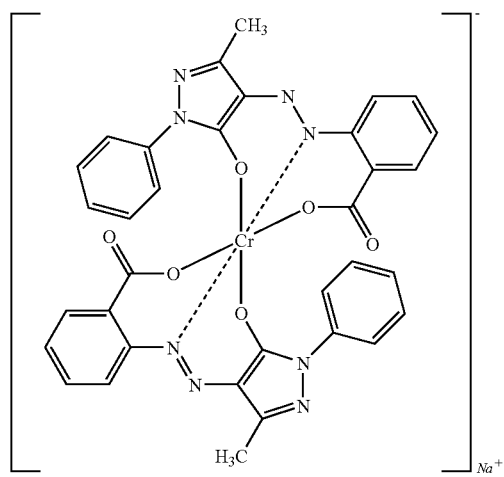 (G1)
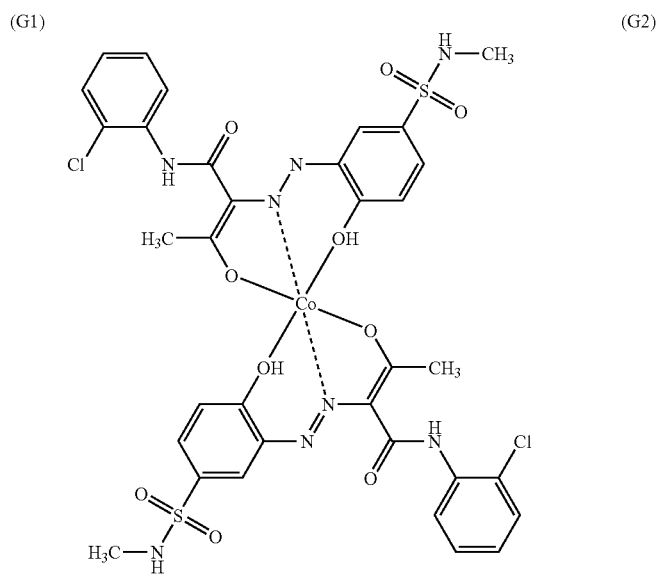 (G2)
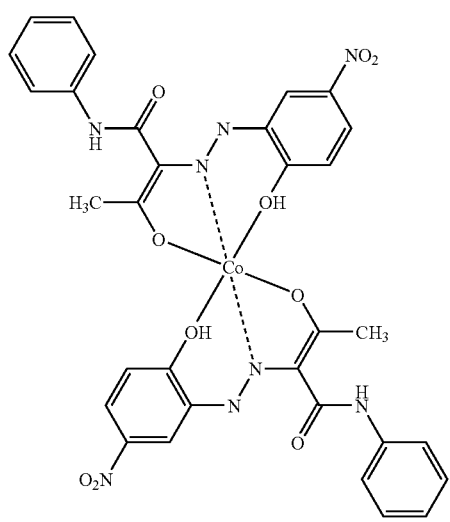 (G3)
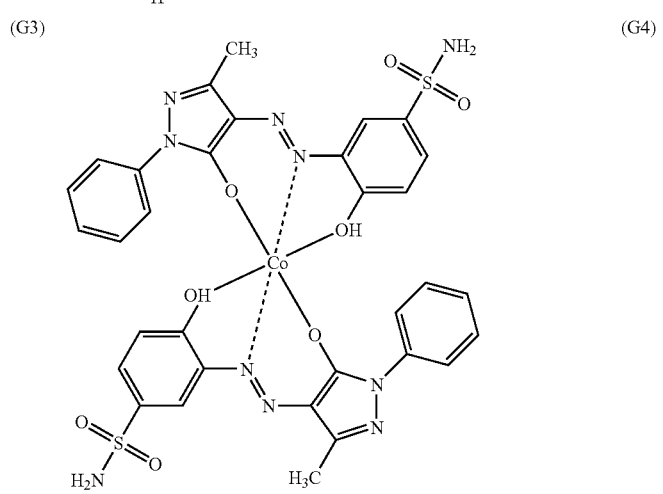 (G4)
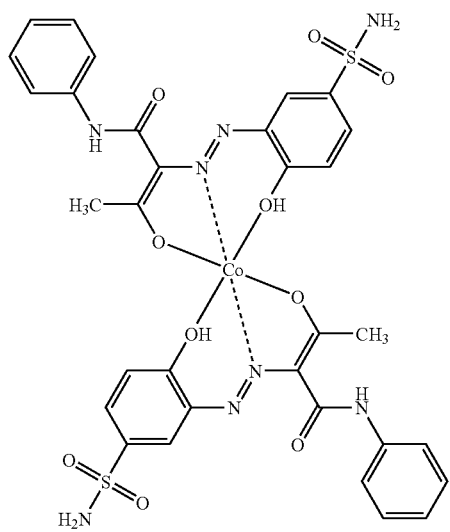 (G5)
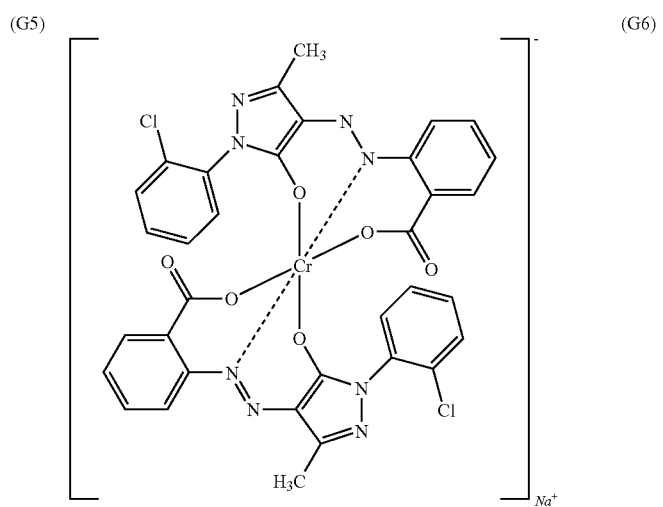 (G6)

-continued
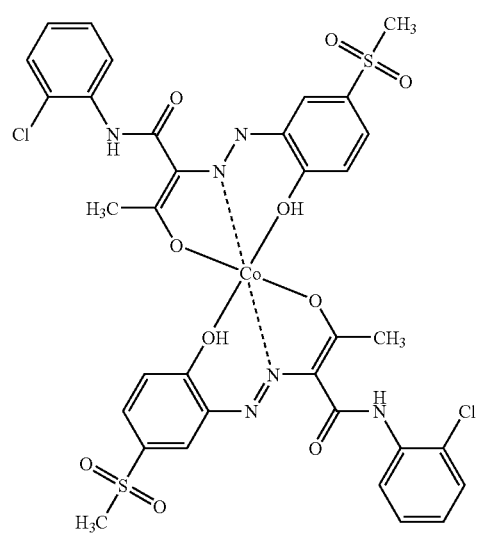
(G7)
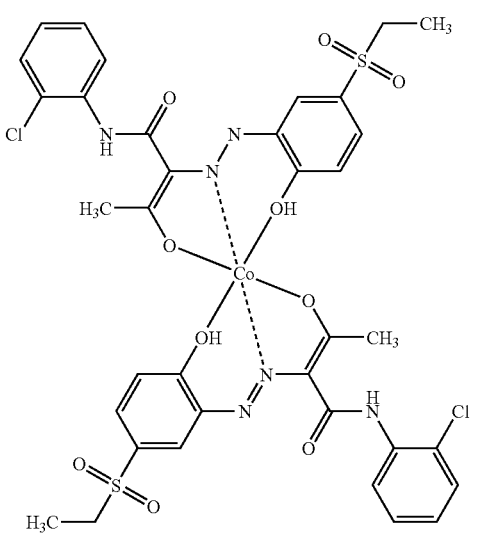
(G8)
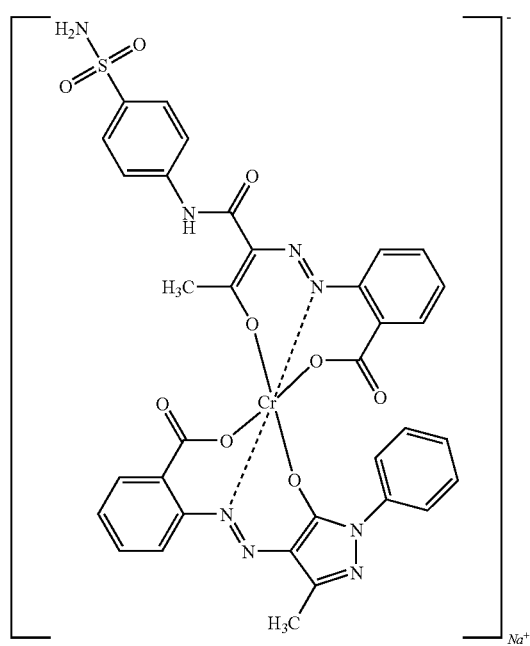
(G9)

-continued
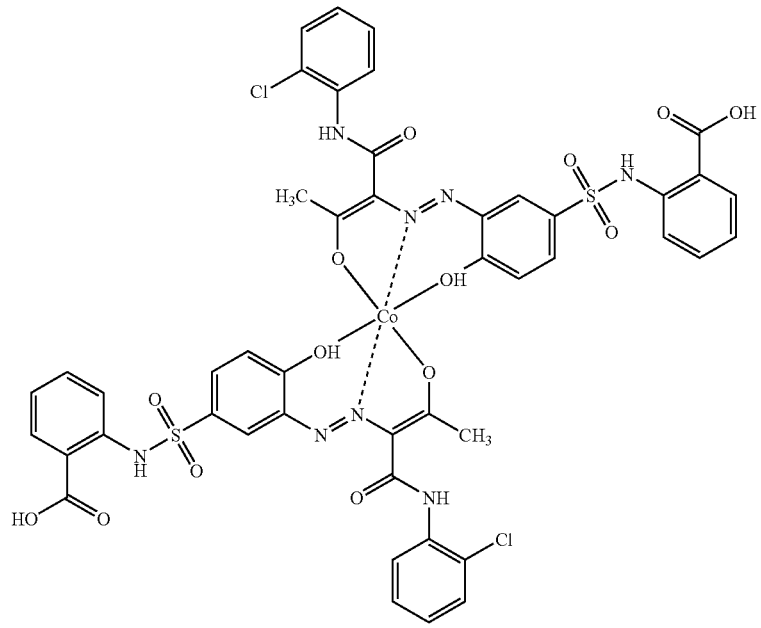
(G10)
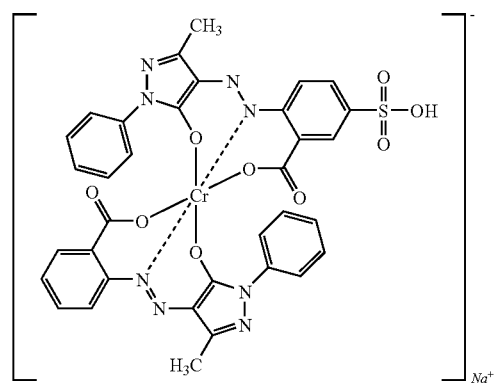
(G11)
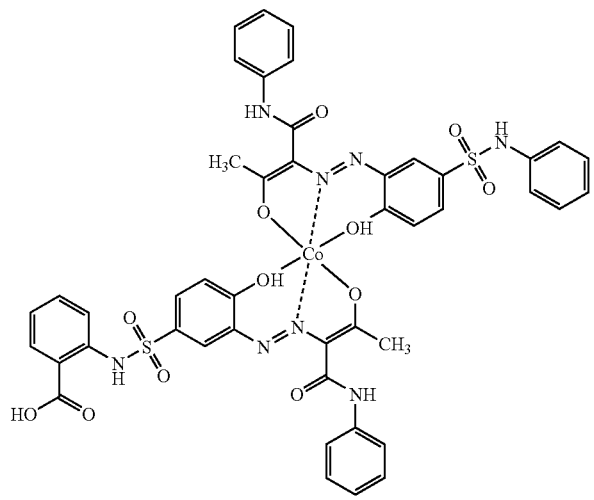
(G12)
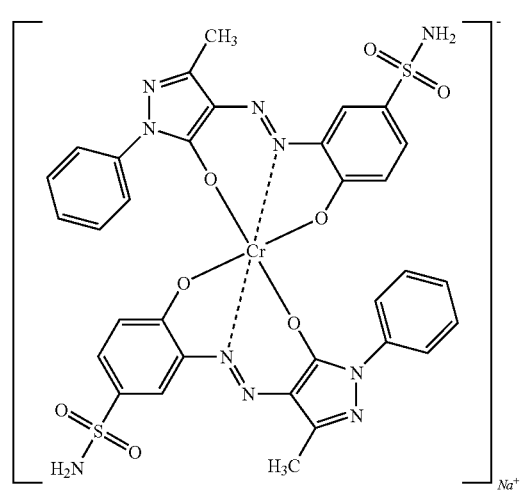
(G13)
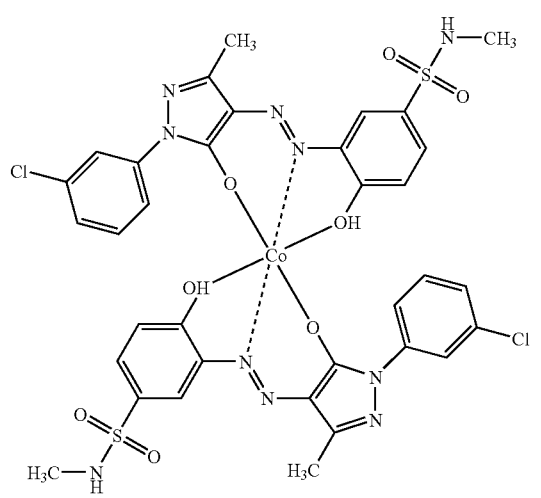
(G14)

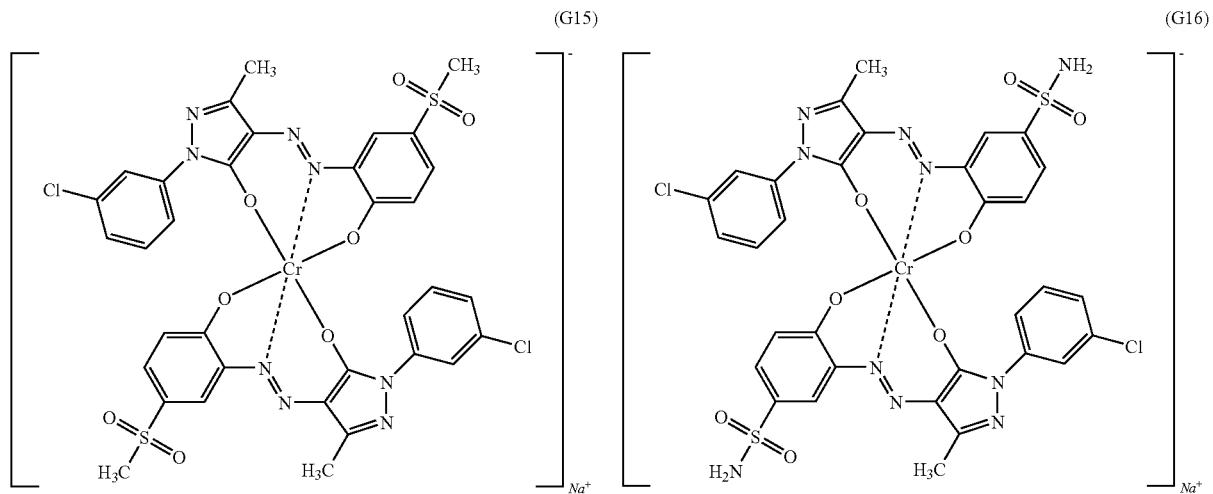
(G15) (G16)
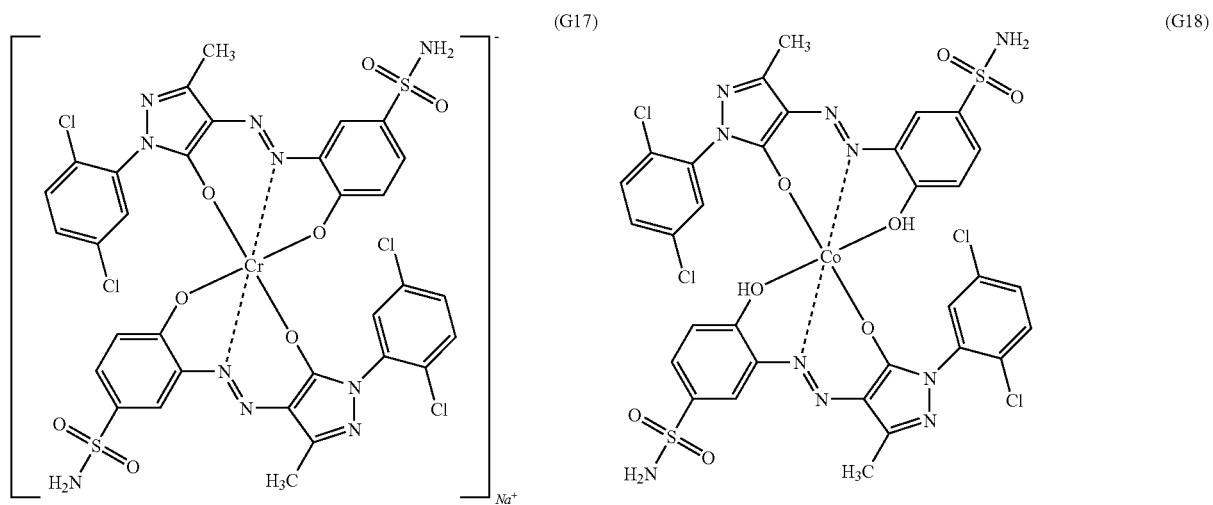
(G17) (G18)
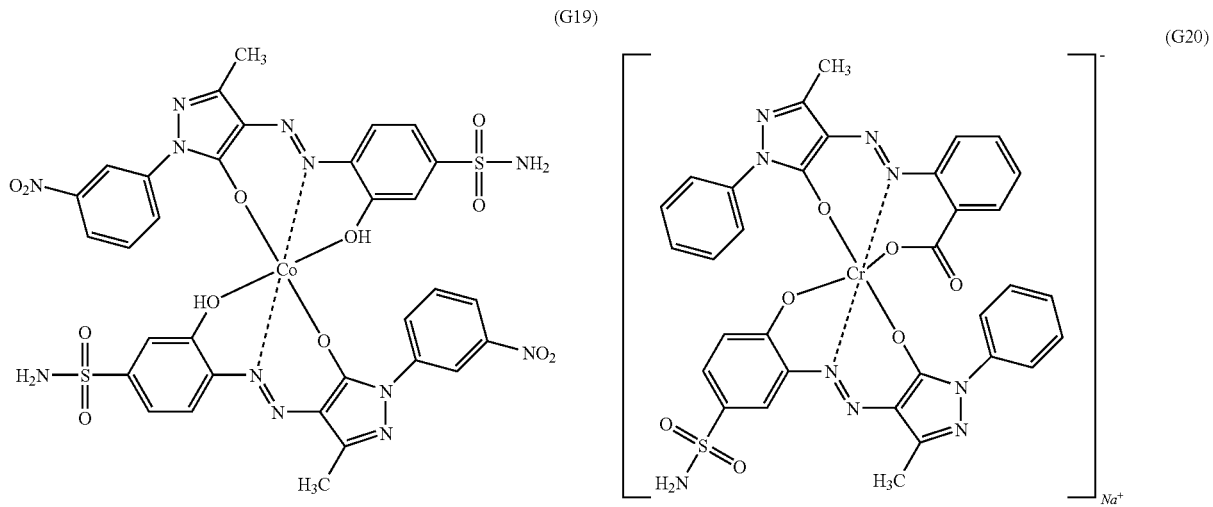
(G19) (G20)

-continued
(G21) 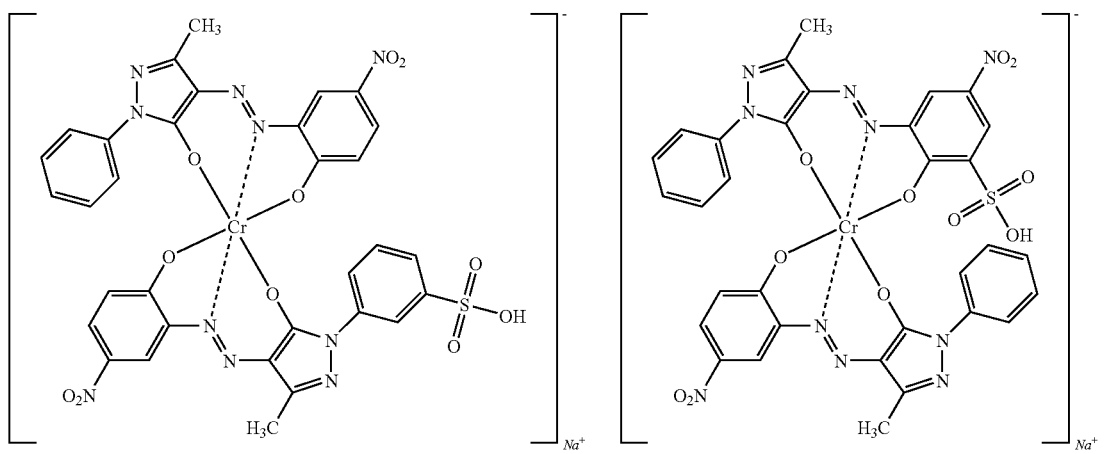
(G22)
(G23) 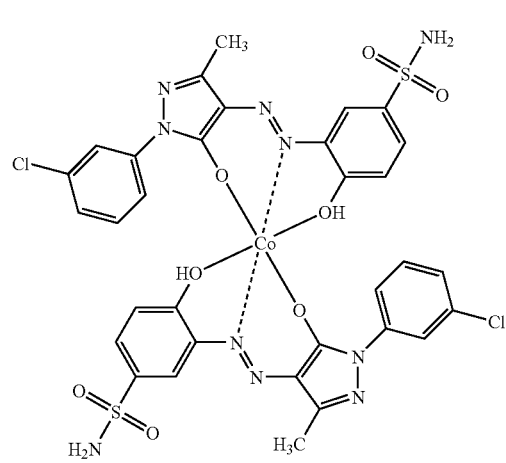
(G24) 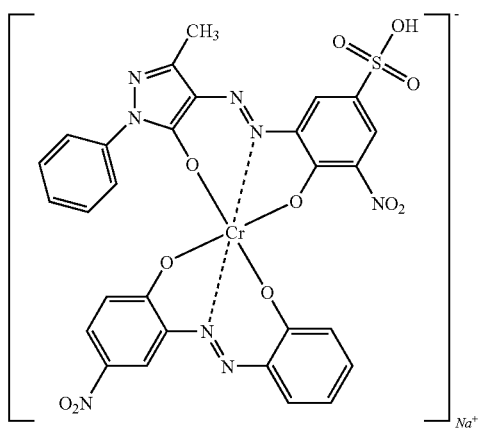
(G25) 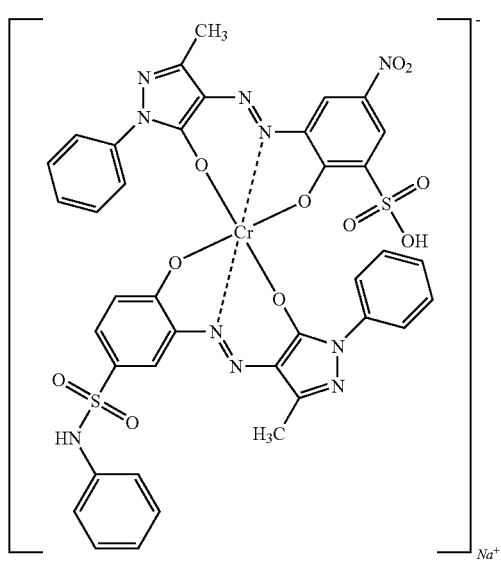

The examples which follow serve to illustrate the invention. The parts are parts by weight and the percentages are weight percentages, unless noted otherwise. The relationship between parts by weight and parts by volume is that of the kilogram to the liter. The compounds described by formula in the examples are preferably prepared, isolated, and used for dyeing in the form of their sodium salts or potassium salts.

PREPARATION EXAMPLE 1

A red-dyeing dye mixture of the invention containing 60 parts of a dye of the formula (1b-1), 10 parts of a dye of the formula (2a-1), and 30 parts of a dye of the formula (2b-1) is prepared by processing 60 parts of the dye of the formula (1b-1) in the form of its sodium salt with 30 parts of the dye of the formula (2a-1) in the form of its sodium salt and 10 parts of the dye of the formula (2b-1) in the form of its sodium salt in a commercially customary mixer to a homogeneous mixture referred to below as dye mixture 1.

PREPARATION EXAMPLE 2

A red-dyeing dye mixture of the invention containing 45 parts of a dye of the formula (1a-1)

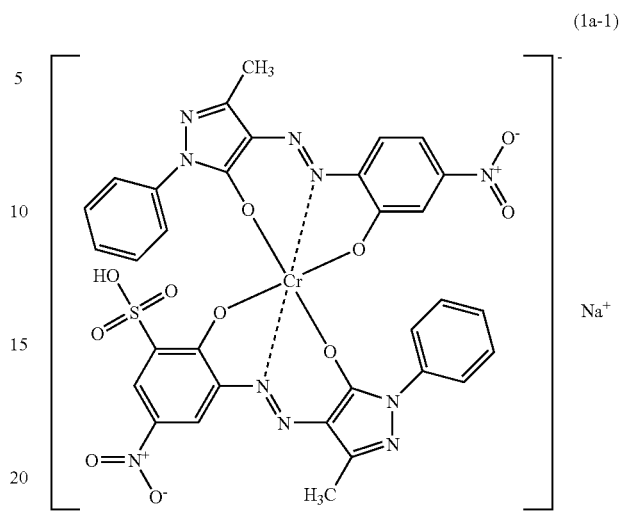

(1a-1)

and 55 parts of a dye of the formula (2b-1) is prepared by processing 45 parts of the dye of the formula (1 a-1) in the form of its sodium salt and 55 parts of the dye of the formula (2b-1) in the form of its sodium salt in a commercially customary mixer to a homogeneous mixture referred to below as dye mixture 2.

EXAMPLES 3-21

Examples 3-21 of the invention are prepared in the same way as in preparation example 1, using the following components:

| Ex. | Dye of formula 1 | Dyes of formula 2 |
| --- | --- | --- |
| 3 | | |

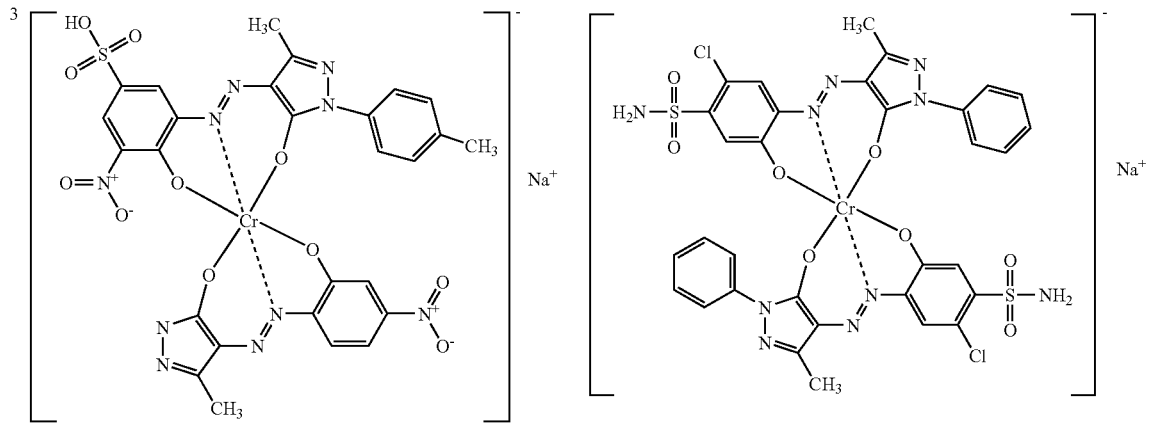

-continued
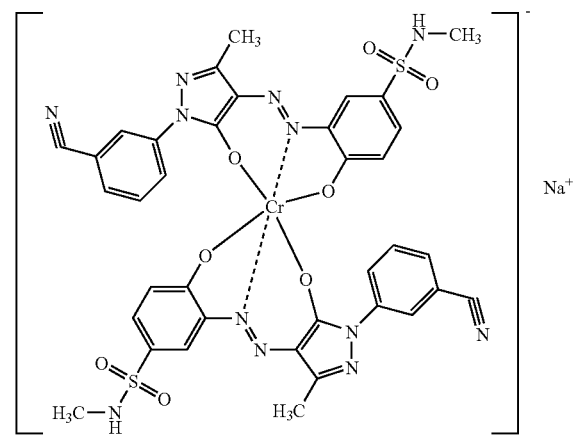
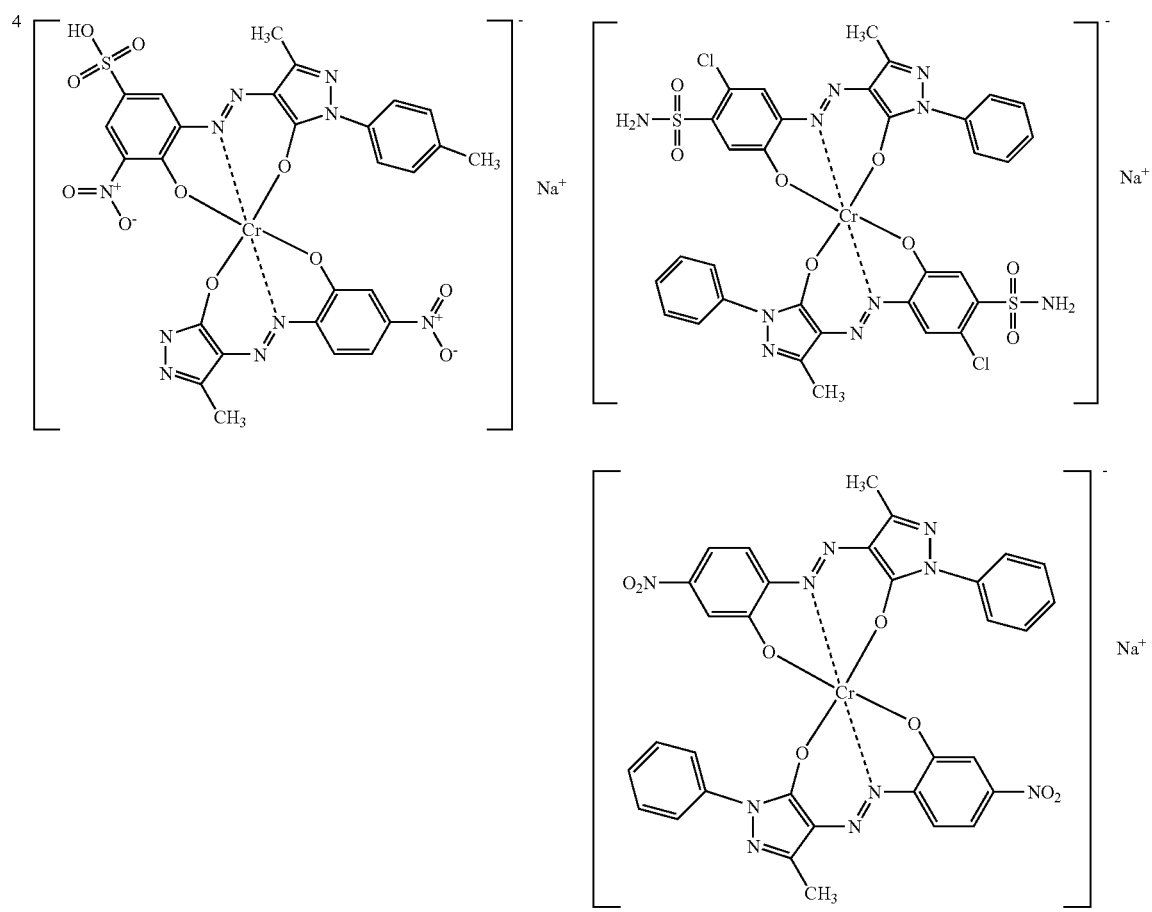

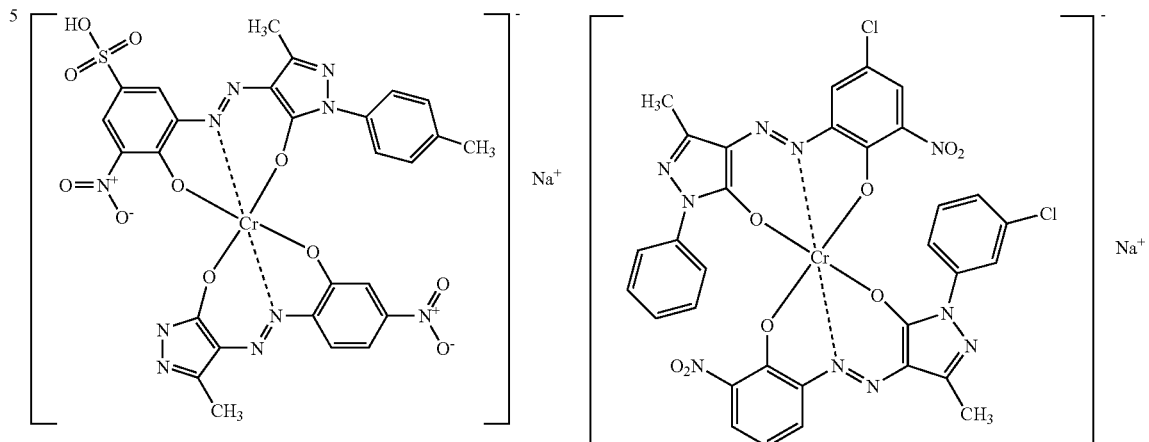
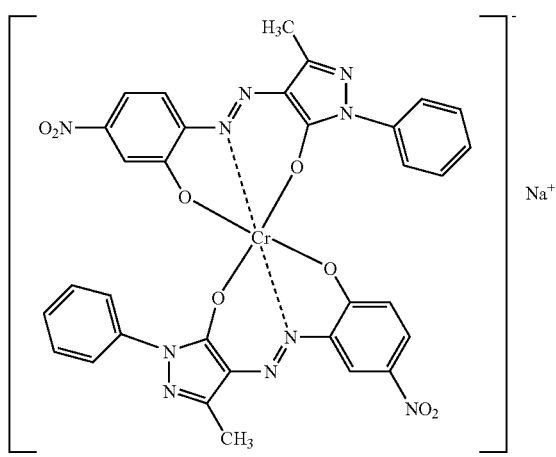
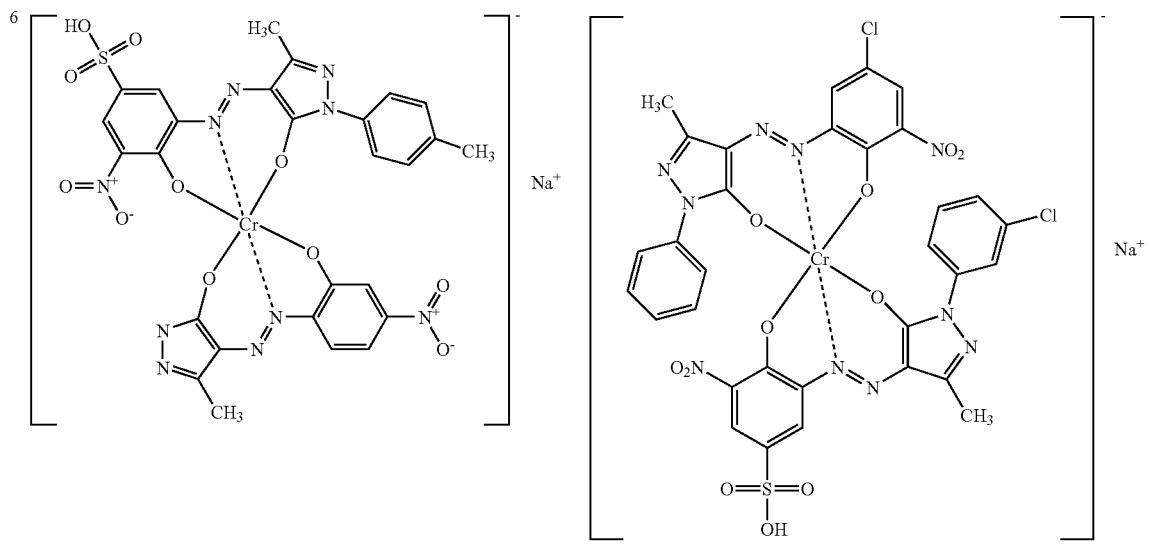
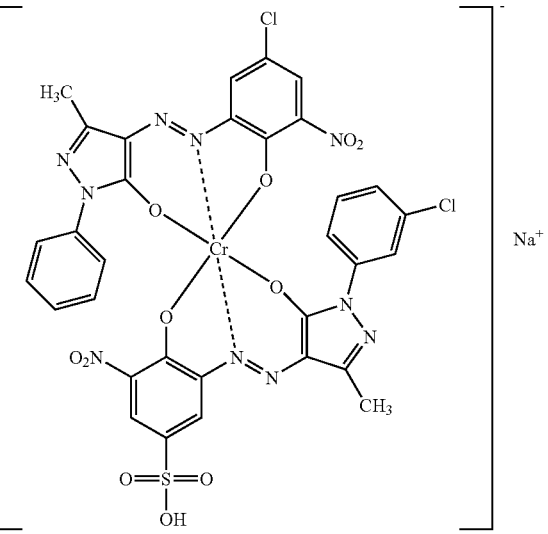

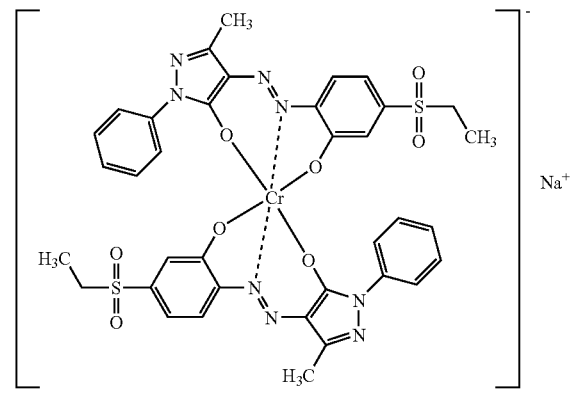
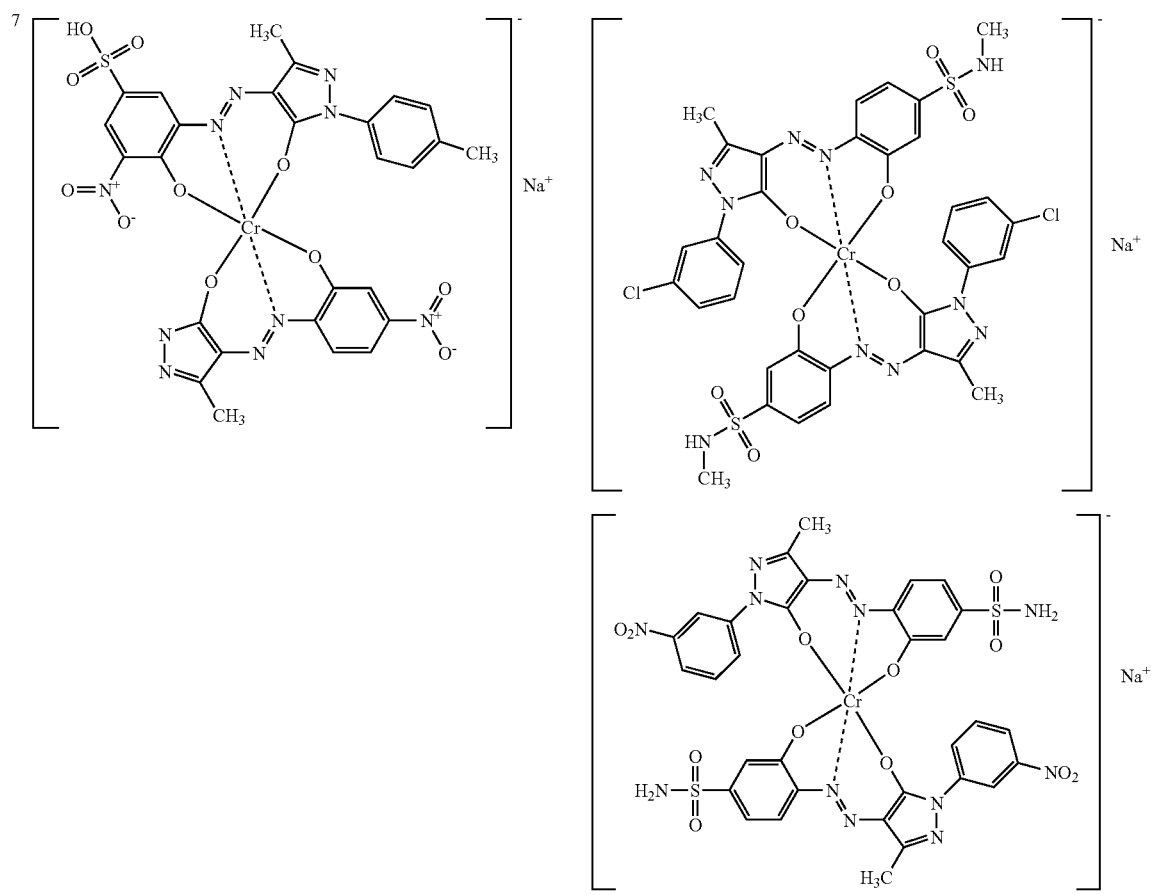

-continued
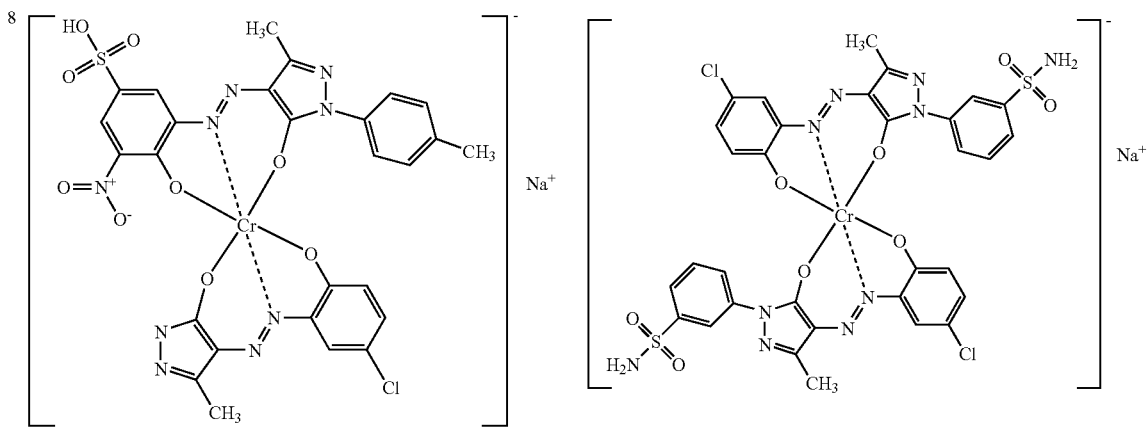
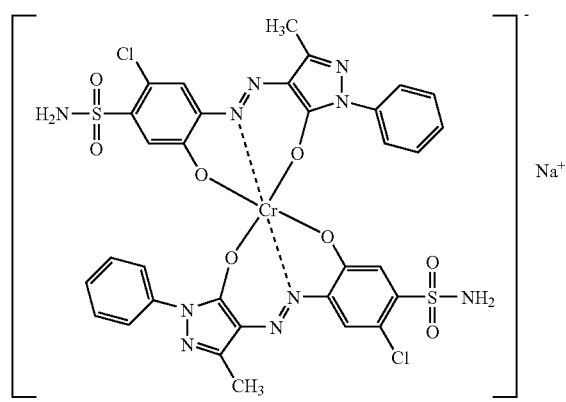
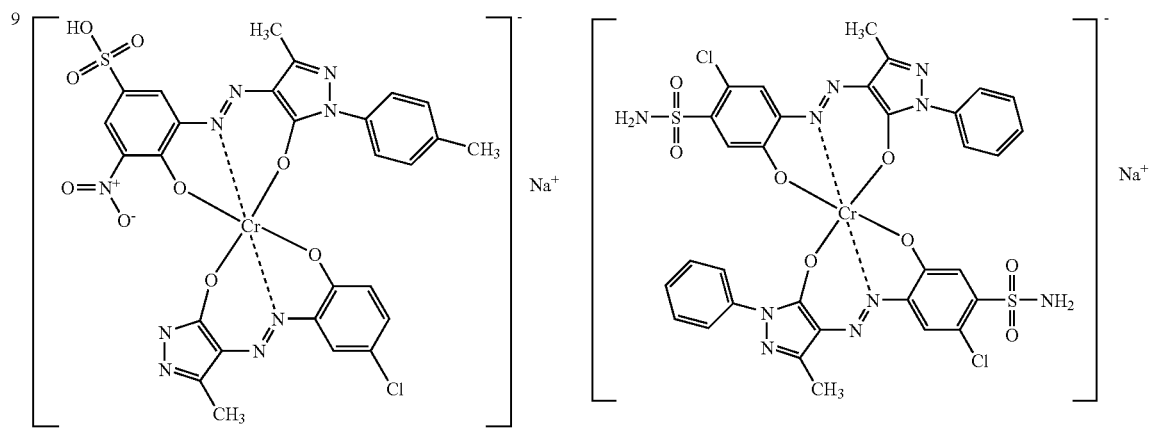

-continued
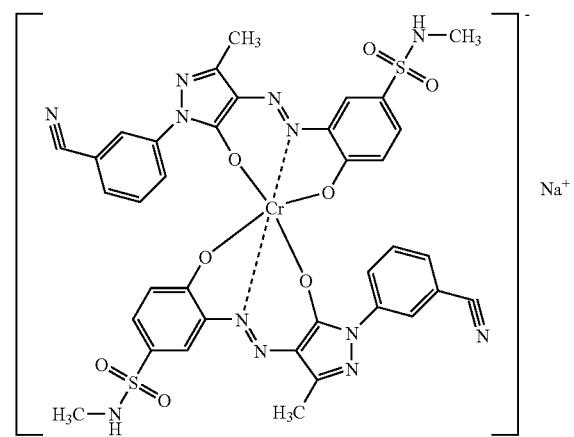
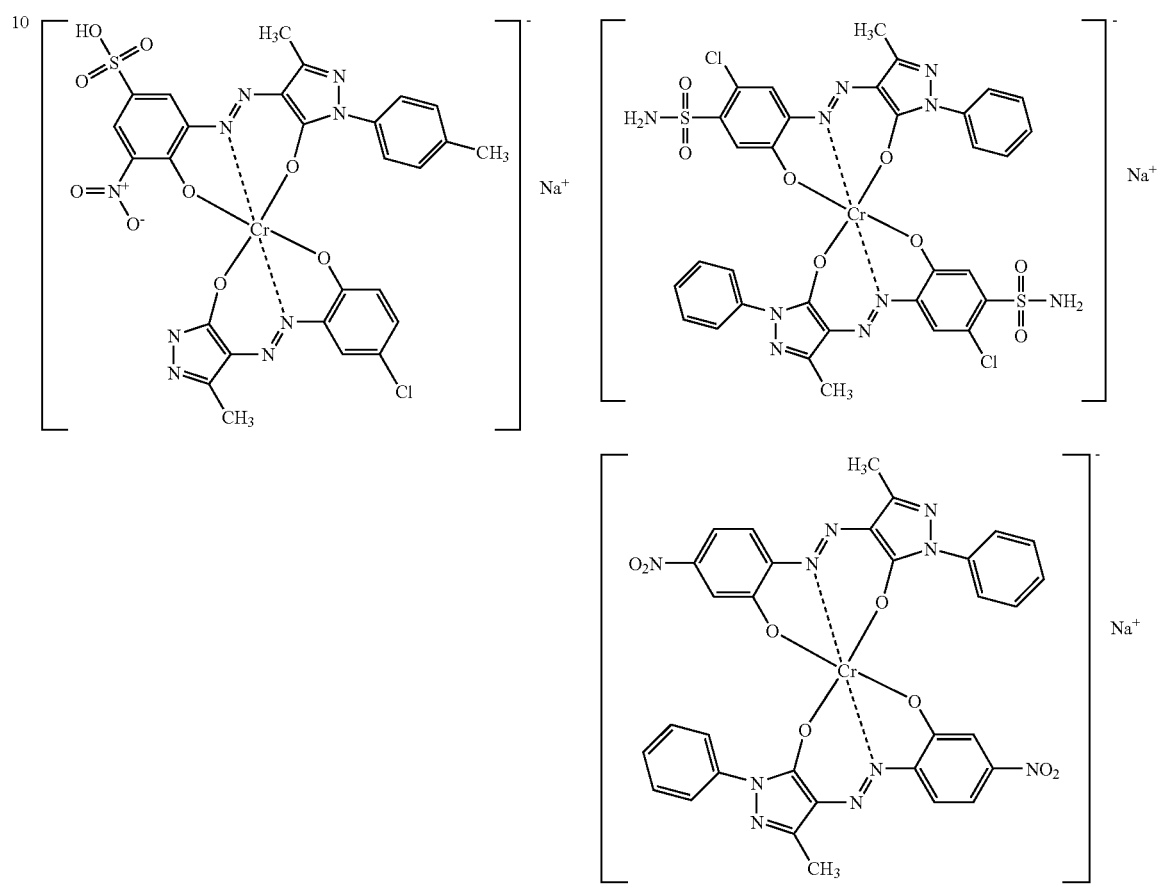

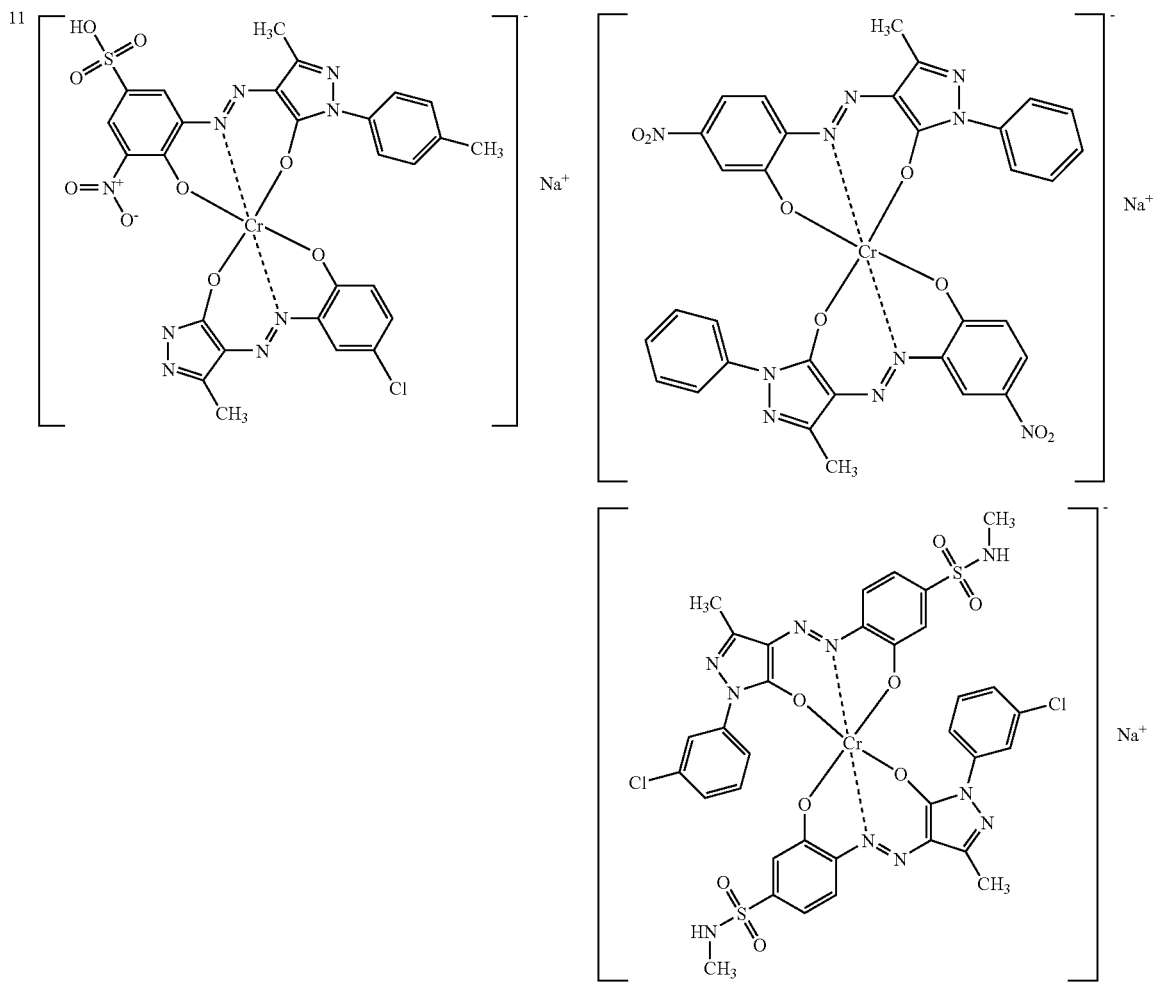
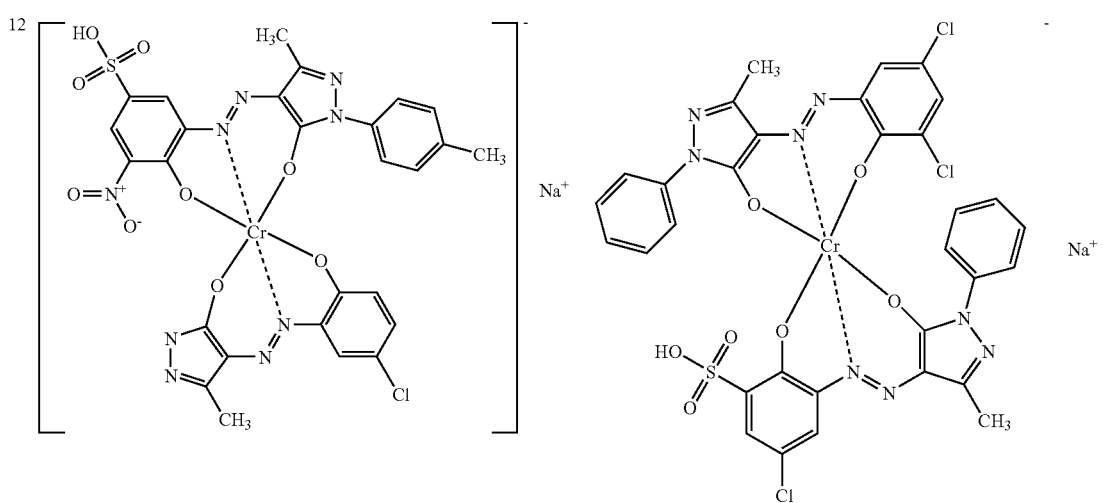

-continued
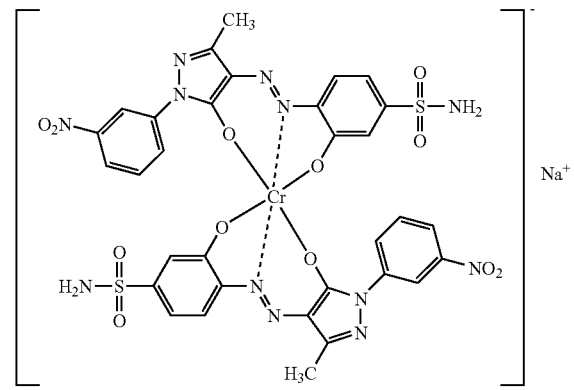
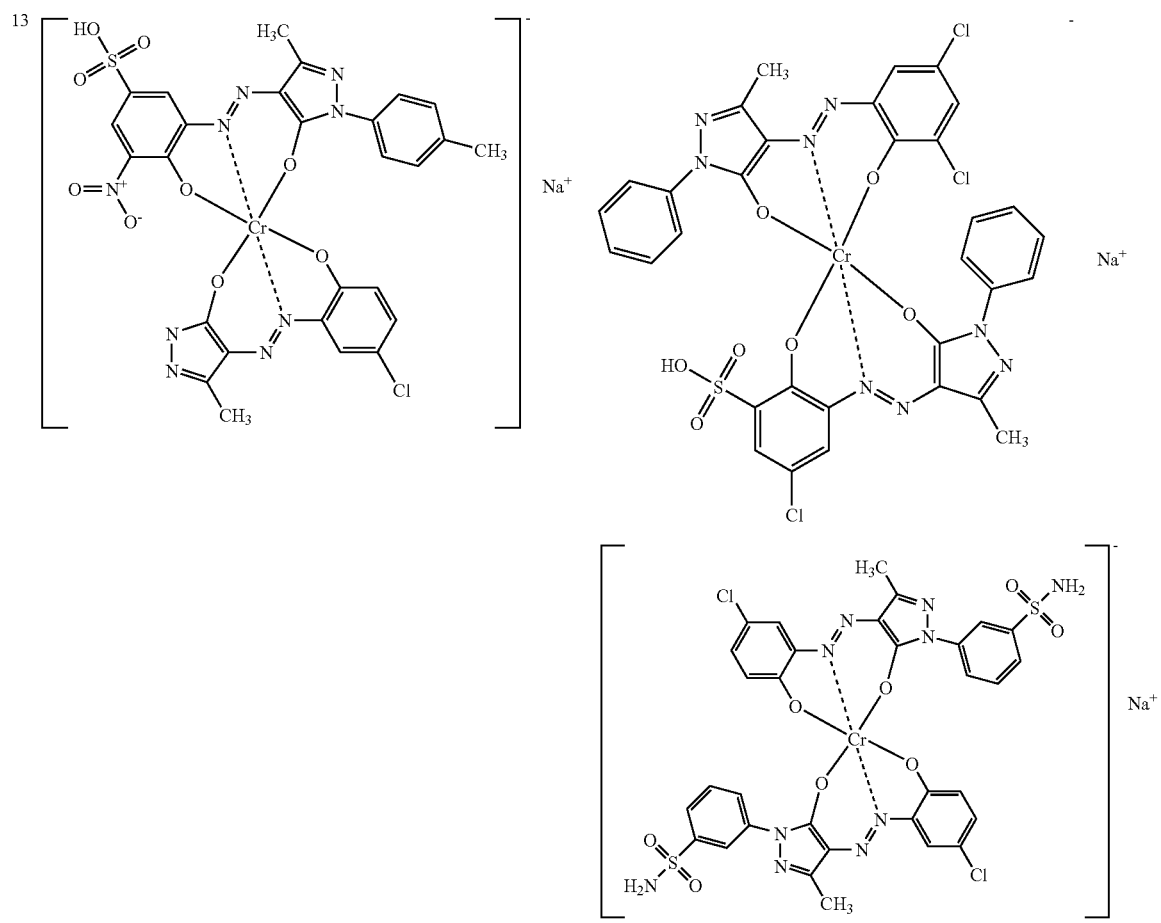

-continued
| Ex. | Dye of formula 1 | Dye of formula 2 |
|---|---|---|
| 14 | 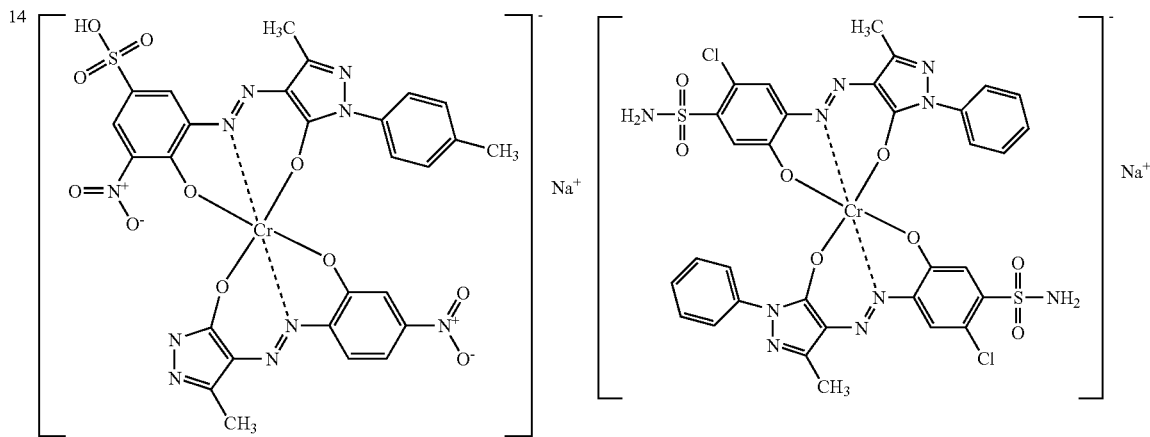 | |
| 15 | 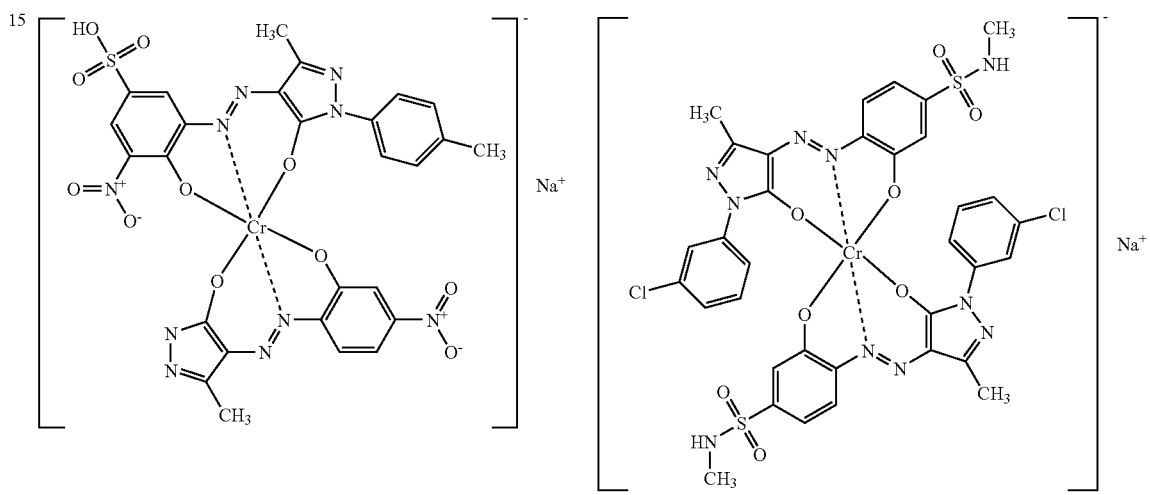 | |
| 16 | 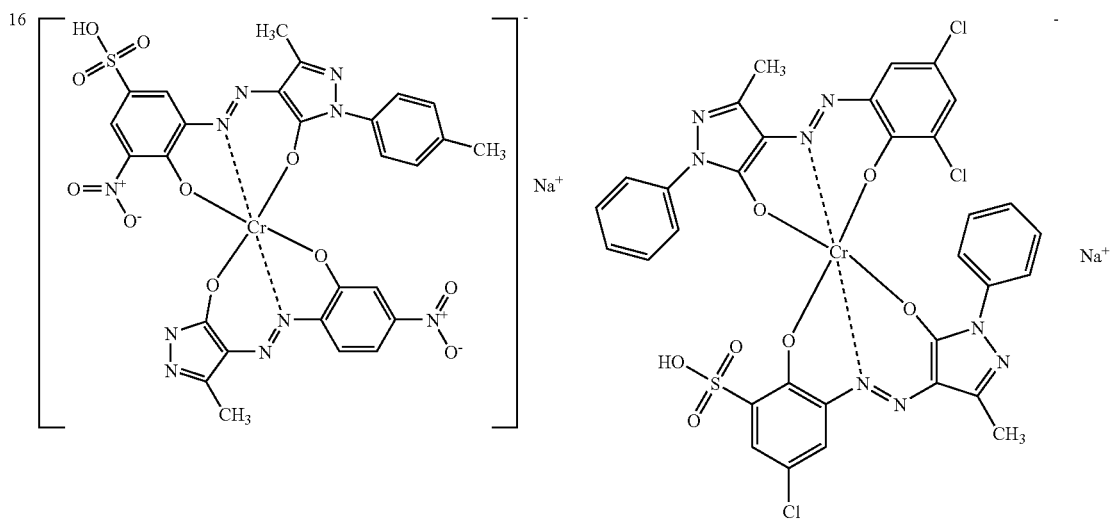 | |

-continued
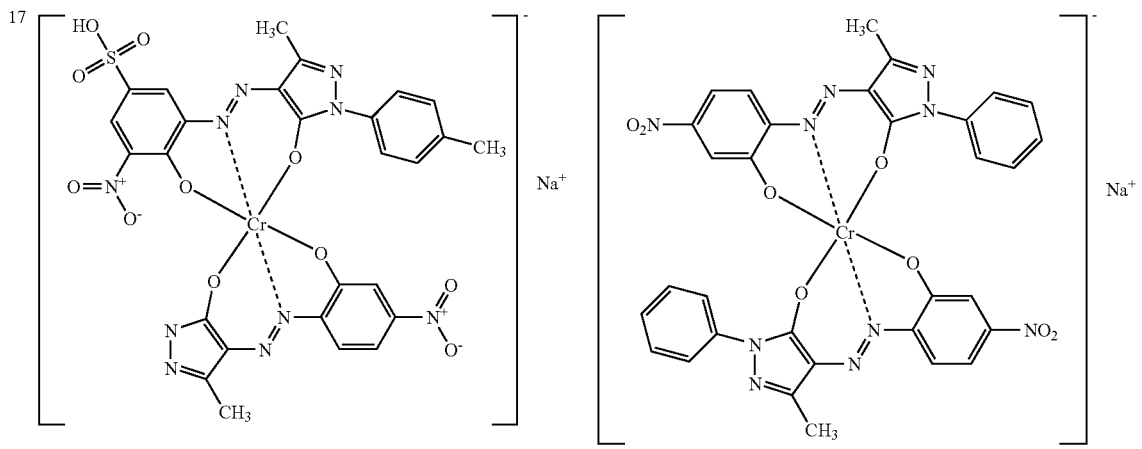
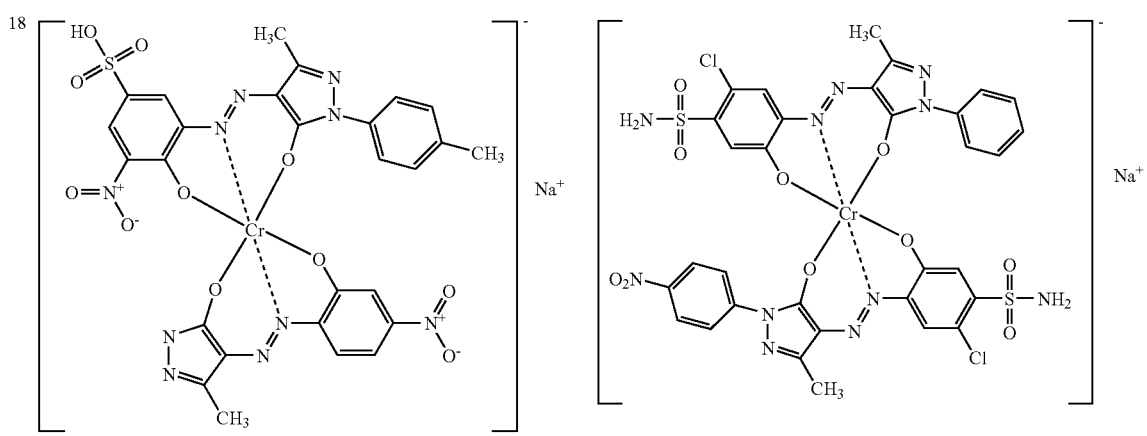
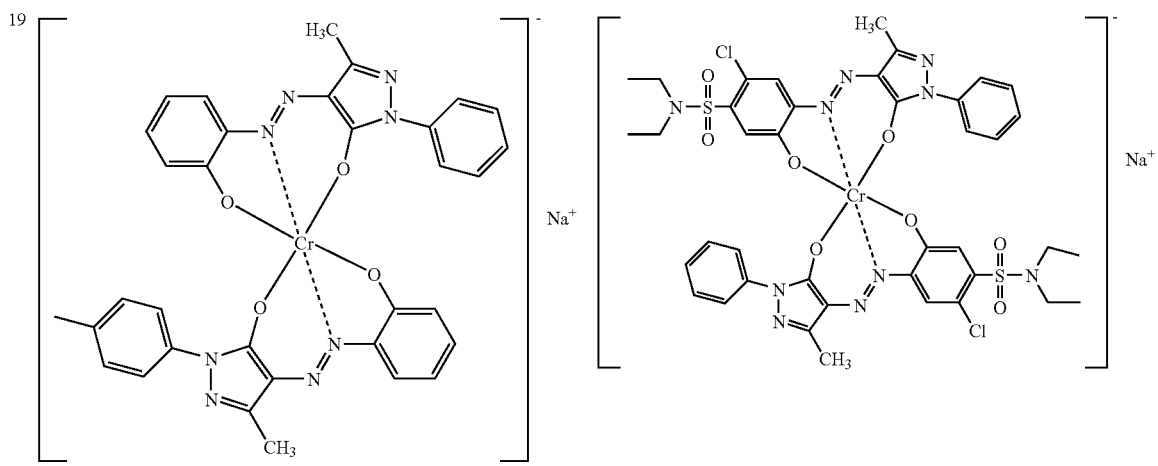

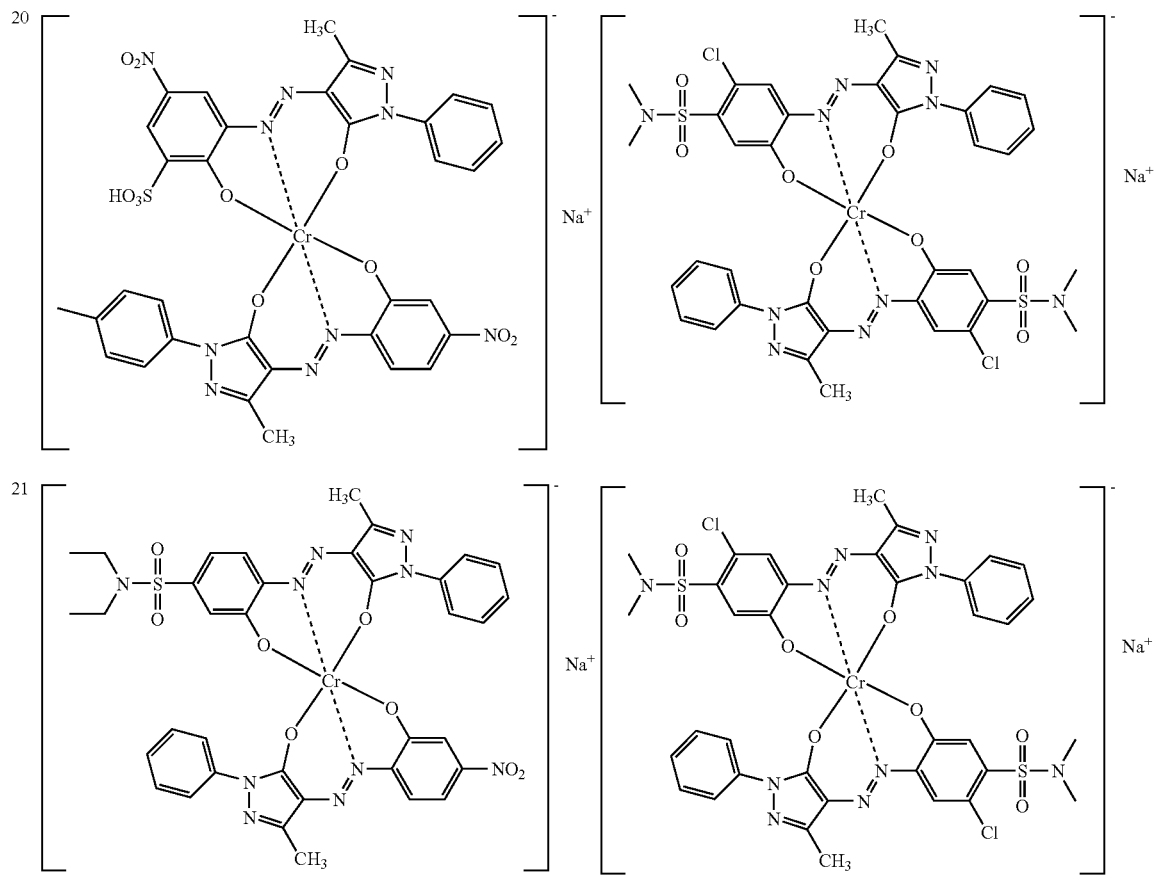

DYEING EXAMPLE 1

1 part of dye mixture 1 from preparation example 1 is dissolved in 2000 parts of water and the solution is admixed with 5 parts of sodium sulfate, 1 part of a leveling auxiliary (based on a condensation product of a high aliphatic amine and ethylene oxide), and 5 parts of sodium acetate.

The pH is then adjusted with acetic acid (80%) to a level of 4.5. The dye bath is heated at 50° C. for 10 minutes and then entered with 100 parts of a wool fabric. Heating is carried out to a temperature of 100° C. over the course of 50 minutes, and dyeing at said temperature for 60 minutes. This is followed by cooling to 90° C. and removal of the dyed material. The wool fabric is washed with hot and cold water, then whizzed and dried.

A red dyeing is obtained which has good light fastness and wet fastness and is level in the fiber.

DYEING EXAMPLE 2

1 part of the dye mixture from preparation example 1 is dissolved in 2000 parts of water and the solution is admixed with 1 part of a leveling auxiliary (based on a condensation product of a high aliphatic amine and ethylene oxide), and 5 parts of sodium acetate. The pH is then adjusted with acetic acid (80%) to a level of 5. The dye bath is heated at 50° C. for 10 minutes and then entered with 100 parts of a nylon fabric. Heating is carried out to a temperature of 110° C. over the course of 50 minutes, and dyeing at said temperature for 60 minutes. This is followed by cooling to 60° C. and removal of the dyed material. The nylon fabric is washed with hot and cold water, soaped, then whizzed and dried.

A red dyeing is obtained which has good light fastness and wet fastness and is level in the fiber.

All of the dye mixtures of preparation examples 2-21 as well are dyed in accordance with dyeing examples 1 and 2.

Further dyeing examples for combination dyeings, for achieving different shades, can be taken from the tabular examples below. Darker or lighter dyeings can be obtained by using greater or lesser quantities of dye accordingly

| Dyeing example | Parts | Shade |
|---|---|---|
| 3 | 0.05 red-dyeing dye mixture 1<br>0.35 blue-dyeing dye of formula (B8)<br>0.60 yellow-dyeing dye of formula (G2) | green |
| 4 | 0.30 red-dyeing dye mixture 2<br>0.70 yellow-dyeing dye of formula (G10) | orange |
| 5 | 0.45 red-dyeing dye mixture 1<br>0.55 yellow-dyeing equimolar mixture of dyes of formulae (G2) and (G10) | orange |
| 6 | 0.55 red-dyeing dye mixture 1<br>0.45 blue-dyeing dye of formula (B8) | violet |
| 7 | 0.40 red-dyeing dye mixture 1<br>0.30 blue-dyeing equimolar mixture of dyes of formulae (B8) and (B28)<br>0.30 yellow-dyeing equimolar mixture of dyes of formulae (G2) and (G10) | brown |

| Dyeing example | Parts | Shade |
|---|---|---|
| 8 | 0.45 red-dyeing dye mixture 2<br>0.30 blue-dyeing equimolar mixture of dyes of formulae (B8) and (B28)<br>0.25 yellow-dyeing dye of formula (G2) | brown |

What is claimed is:

1. A dye mixture which comprises one or more dyes of the formula (1)

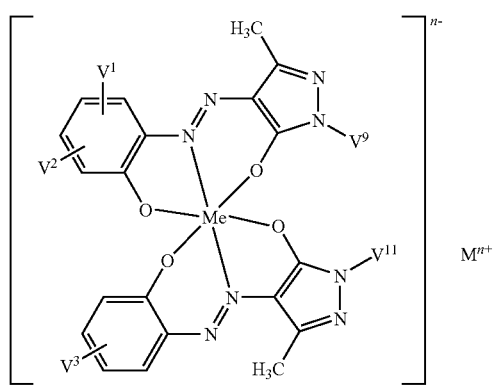

and at least one dye of the formula (2)

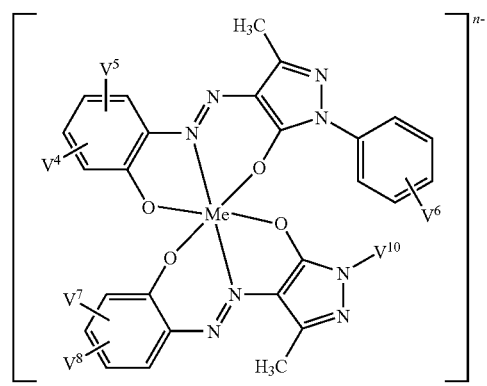

in which

Me is $Cr^{(3+)}$ or $Co^{(2+)}$,

M is hydrogen, an alkali metal, or the equivalent of an alkaline earth metal, n is 1 or 2

$V^1$ to $V^8$ are independently of one another and are hydrogen, cyano, $C_1$-$C_4$-alkyl, $C_1$-$C_4$-alkylsulfonyl, $C_1$-$C_4$-alkoxy, halogen, nitro, sulfo, sulfamoyl, N—$C_{1-4}$-alkylsulfamoyl, N—$C_{1-4}$-dialkylsulfamoyl or N—$C_{1-2}$-alkoxy-$C_{1-2}$-alkylsulfamoyl, $V^9$ and $V^{10}$ are independently of one another and are phenyl, $C_1$-$C_4$-alkylphenyl, nitrophenyl, sulfophenyl, N—$C_{1-4}$-alkylsulfamoylphenyl, halophenyl, cyanophenyl, or sulfamoylphenyl, $V^{11}$ is hydrogen, phenyl, $C_1$-$C_4$-alkylphenyl, nitrophenyl, sulfophenyl, N—$C_{1-4}$-alkylsulfamoylphenyl, halophenyl or cyanophenyl, and, if $V^{11}$ is not hydrogen, at least one of the radicals $V^7$ or $V^8$ is N—$C_{1-4}$-dialkyl-sulfamoyl.

2. The dye mixture as claimed in claim 1, comprising at least one dye of the formula (1a)

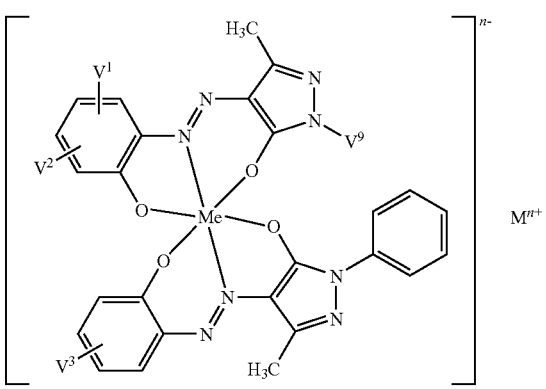

and also at least one dye of the formula (2b)

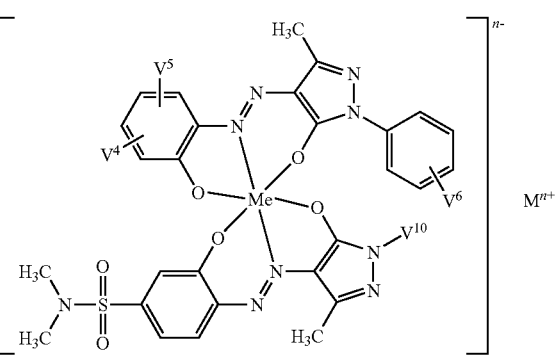

wherein

Me is $Cr^{(3+)}$ or $Co^{(2+)}$,

M is hydrogen, an alkali metal, or the equivalent of an alkaline earth metal, n is 1 or 2, $V^1$ to $V^6$ are independently of one another hydrogen, cyano, $C_1$-$C_4$-alkyl, $C_1$-$C_4$-alkylsulfonyl, $C_1$-$C_4$-alkoxy, halogen, nitro, sulfo, sulfamoyl, N—$C_{1-4}$-alkylsulfamoyl, N—$C_{1-4}$-dialkylsulfamoyl or N—$C_{1-2}$-alkoxy-$C_{1-2}$-alkylsulfamoyl, $V^9$ and $V^{10}$ are independently of one another phenyl, $C_1$-$C_4$-alkylphenyl, nitrophenyl, sulfophenyl, N—$C_{1-4}$-alkylsulfamoylphenyl, halophenyl or cyanophenyl.

3. The dye mixture as claimed in claim 1, comprising at least one dye of the formula (1b), at least one dye of the formula (2a), and at least one dye of the formula (2b)

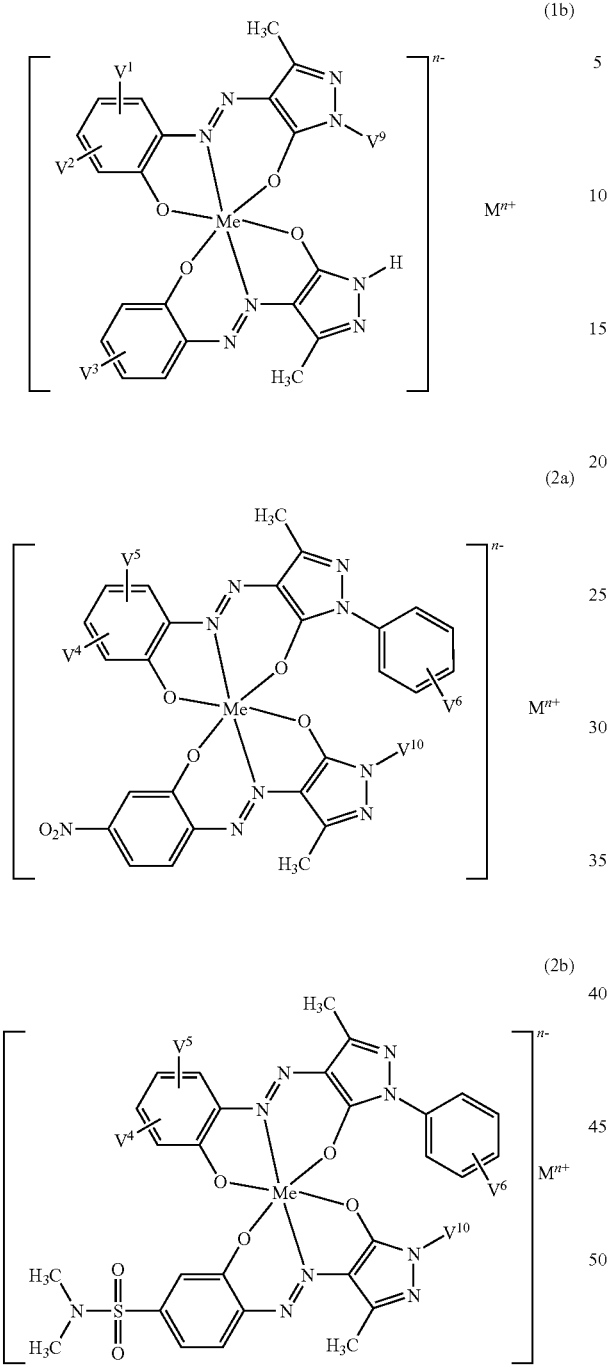

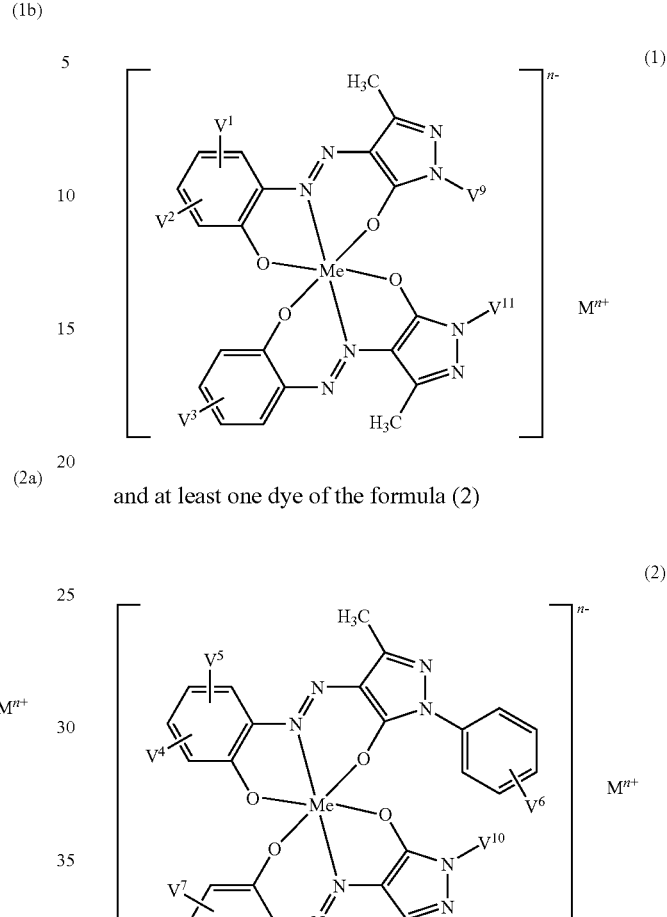

in which V¹ to V⁶ and V⁹ and V¹⁰ are as defined in claim 1.

4. The dye mixture as claimed in claim 1, comprising dyes of the formula (1) and dyes of the formula (2) in a molar ratio of dye or dyes (1) to dye or dyes (2) of 95:5 to 5:95.

5. The dye mixture as claimed in claim 1, comprising dyes of the formula (1) and dyes of the formula (2) in a molar ratio of dye or dyes (1) to dye or dyes (2) of 80:20 to 40:60.

6. A process for preparing a dye mixture which comprises one or more dyes of the formula (1)

and at least one dye of the formula (2)

in which

Me is $Cr^{(3+)}$ or $Co^{(2+)}$,

M is hydrogen, an alkali metal, or the equivalent of an alkaline earth metal, n is 1 or 2

$V^8$ to are independently of one another and are hydrogen, cyano, $C_1$-$C_4$-alkyl, $C_1$-$C_4$-alkylsulfonyl, $C_1$-$C_4$-alkoxy, halogen, nitro, sulfo, sulfamoyl, N—$C_{1\text{-}4}$-alkylsulfamoyl, N—$C_{1\text{-}4}$-dialkylsulfamoyl or N—$C_{1\text{-}2}$-alkoxy-$C_{1\text{-}2}$-alkylsulfamoyl, $V^9$ and $V^{10}$ are independently of one another and are phenyl, $C_1$-$C_4$-alkylphenyl, nitrophenyl, sulfophenyl, N—$C_{1\text{-}4}$-alkylsulfamoylphenyl, halophenyl, cyanophenyl, preferably or sulfamoylphenyl, $V^{11}$ is hydrogen, phenyl, $C_1$-$C_4$-alkylphenyl, nitrophenyl, sulfophenyl, N—$C_{1\text{-}4}$-alkylsulfamoylphenyl, halophenyl or cyanophenyl, and, if $V^{11}$ is not hydrogen, at least one of the radicals $V^7$ or $V^8$ is N—$C_{1\text{-}4}$-dialkylsulfamoyl, which comprises mechanical mixing of the individual dyes, whether in the form of their powders or granules or their synthesis solution or of aqueous solutions of the individual dyes.

7. A process for dyeing or printing material which comprises contacting the material with a dye mixture, wherein the dye mixture comprises one or more dyes of the formula (1)

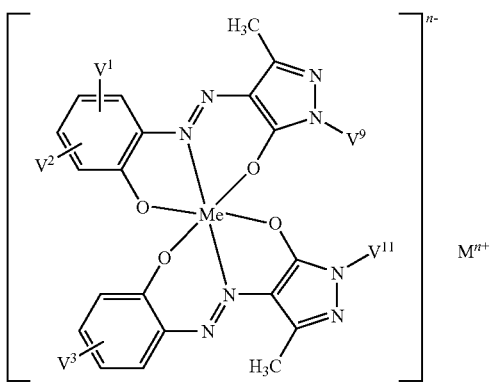

and at least one dye of the formula (2)

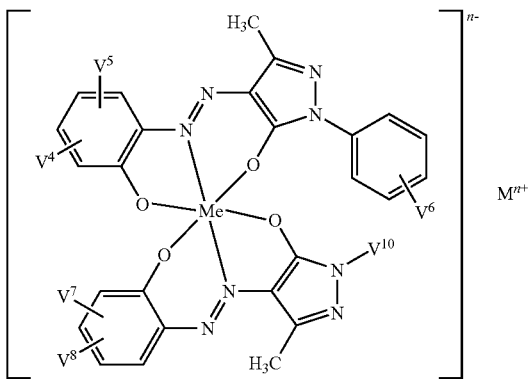

in which
Me is $Cr^{(3+)}$ or $Co^{(2+)}$,
M is hydrogen, an alkali metal, or the equivalent of an alkaline earth metal,
n is 1 or 2

$V^1$ to $V^8$ are independently of one another and are hydrogen, cyano, $C_1$-$C_4$-alkyl, $C_1$-$C_4$-alkylsulfonyl, $C_1$-$C_4$-alkoxy, halogen, nitro, sulfo, sulfamoyl, N—$C_{1-4}$-alkylsulfamoyl, N—$C_{1-4}$-dialkylsulfamoyl or N—$C_{1-2}$-alkoxy-$C_{1-2}$-alkylsulfamoyl, $V^9$ and $V^{10}$ are independently of one another and are phenyl, $C_1$-$C_4$-alkylphenyl, nitrophenyl, sulfophenyl, N—$C_{1-4}$-alkylsulfamoylphenyl, halophenyl, cyanophenyl, preferably or sulfamoylphenyl, $V^{11}$ is hydrogen, phenyl, $C_1$-$C_4$-alkylphenyl, nitrophenyl, sulfophenyl, N—$C_{1-4}$-alkylsulfamoylphenyl, halophenyl or cyanophenyl, and, if $V^{11}$ is not hydrogen, at least one of the radicals $V^7$ or $V^8$ is N—$C_{1-4}$-dialkylsulfamoyl.

8. The process as claimed in claim 7, wherein the material is hydroxyl- and carboxamido-containing material.

9. The process as claimed in claim 7, wherein the material is a natural or synthetic polyamide fiber material.

10. The process as claimed in claim 9, wherein the process is for the single-bath on-tone dyeing of blends of natural and synthetic polyamide fiber materials.

11. The dye mixture as claimed in claim 1, which further comprises a blue-dyeing acid dye, a black-dyeing acid dye, a yellow-dyeing acid dye or an orange-dyeing acid dye.

12. The dye mixture as claimed in claim 1, which further comprises at least one of the following CI dyes: Acid Blue 170, 171, 199, 200, 229, 317, 284, 296, 334, 335, Acid Black 058, 060, 061, 063, 099, 107, 131, 132, 140, 207, 218, 220, 222, 244, Acid Yellow 059, 116, 119, 137, 151, 155, 177, 182, 220, 232, 235, Acid Orange 060, 080, 086, 088, 107, 108, 117, 130, 144, 154, 162, 166, and 168.

13. The dye mixture as claimed in claim 1, wherein
M is hydrogen, sodium, potassium or lithium,
$V^1$ to $V^8$ are independently of one another nitro, sulfo or dimethylsulfamoyl and
$V^{11}$ is phenyl or $C_1$-$C_4$-alkylphenyl.

14. The dye mixture as claimed in claim 2, wherein
M is hydrogen, sodium, potassium or lithium,
$V^1$ to $V^6$ are independently of one another and are nitro, sulfo, or dimethylsulfamoyl,
$V^9$ and $V^{10}$ are independently of one another are phenyl and $C_1$-$C_4$-alkylphenyl or sulfamoylphenyl.

* * * * *